(12) United States Patent
Ogura et al.

(10) Patent No.: US 9,580,619 B2
(45) Date of Patent: Feb. 28, 2017

(54) AQUEOUS COATING COMPOSITION AND COATING METHOD USING SAME

(71) Applicant: KANSAI PAINT CO., LTD., Hyogo (JP)

(72) Inventors: Kazutaka Ogura, Aichi (JP); Hiroyuki Nagano, Aichi (JP); Hiroshi Igarashi, Aichi (JP); Masami Kobata, Kanagawa (JP)

(73) Assignee: Kansai Paint Co., Ltd., Hyogo (JP)

( * ) Notice: Subject to any disclaimer, the term of this patent is extended or adjusted under 35 U.S.C. 154(b) by 152 days.

(21) Appl. No.: 14/409,339

(22) PCT Filed: Jun. 14, 2013

(86) PCT No.: PCT/JP2013/066485
§ 371 (c)(1),
(2) Date: Dec. 18, 2014

(87) PCT Pub. No.: WO2013/191104
PCT Pub. Date: Dec. 27, 2013

(65) Prior Publication Data
US 2015/0175833 A1 Jun. 25, 2015

(30) Foreign Application Priority Data
Jun. 19, 2012 (JP) ................ 2012-138010

(51) Int. Cl.
| | |
|---|---|
| *B32B 27/00* | (2006.01) |
| *C09D 133/10* | (2006.01) |
| *C09D 123/26* | (2006.01) |
| *C09D 133/00* | (2006.01) |
| *C09D 175/04* | (2006.01) |
| *C08G 18/79* | (2006.01) |
| *C08G 18/80* | (2006.01) |
| *C08G 18/28* | (2006.01) |
| *C09D 5/02* | (2006.01) |
| *C09D 5/00* | (2006.01) |
| *C09D 5/24* | (2006.01) |
| *B05D 1/36* | (2006.01) |
| *B05D 7/00* | (2006.01) |
| *C08G 18/48* | (2006.01) |
| *C08G 18/62* | (2006.01) |
| *C08G 18/70* | (2006.01) |
| *C08G 18/40* | (2006.01) |
| *C08G 18/42* | (2006.01) |
| *C09D 4/06* | (2006.01) |

(52) U.S. Cl.
CPC ............ *C09D 133/10* (2013.01); *B05D 1/36* (2013.01); *B05D 7/52* (2013.01); *C08G 18/283* (2013.01); *C08G 18/4063* (2013.01); *C08G 18/4263* (2013.01); *C08G 18/4833* (2013.01); *C08G 18/6204* (2013.01); *C08G 18/6254* (2013.01); *C08G 18/706* (2013.01); *C08G 18/792* (2013.01); *C08G 18/8064* (2013.01); *C08G 18/8093* (2013.01); *C09D 5/002* (2013.01); *C09D 5/022* (2013.01); *C09D 5/24* (2013.01); *C09D 123/26* (2013.01); *C09D 133/00* (2013.01); *C09D 175/04* (2013.01); *C09D 4/06* (2013.01); *Y10T 428/31551* (2015.04)

(58) Field of Classification Search
CPC ........ C09D 5/002; C09D 133/00; C09D 4/06; C08G 18/792; C08G 18/283; C08G 18/8064; C08G 18/6204; C08G 18/6254; C08G 18/10; C08G 18/2895; B05D 1/36; Y10T 428/31551
See application file for complete search history.

(56) References Cited

U.S. PATENT DOCUMENTS

| | | | |
|---|---|---|---|
| 6,696,539 B2 * | 2/2004 | Kobata | ............... C09D 175/06 525/123 |
| 2002/0165335 A1 | 11/2002 | Kobata et al. | |
| 2011/0135935 A1 | 6/2011 | Adachi et al. | |
| 2011/0135936 A1 | 6/2011 | Katsuta et al. | |
| 2012/0305862 A1 | 12/2012 | Kasahara et al. | |
| 2014/0030528 A1 | 1/2014 | Kitagawa et al. | |
| 2014/0031484 A1 | 1/2014 | Kobata et al. | |

FOREIGN PATENT DOCUMENTS

| | | | | |
|---|---|---|---|---|
| CA | 2788725 A1 | 8/2011 | | |
| EP | 2009071 A1 * | 6/2008 | ........... | C09D 123/26 |

(Continued)

OTHER PUBLICATIONS

STIC Seach Report dated Jul. 6, 2016.*

(Continued)

*Primary Examiner* — Eisa Elhilo
(74) *Attorney, Agent, or Firm* — Millen White Zelano & Branigan, P.C.

(57) ABSTRACT

The objective of the present invention is to provide: an aqueous coating composition which has excellent adhesiveness to a plastic substrate and which is capable of forming a multilayer coating film, which has excellent finishing property and water resistance and in which mixing of the layers does not occur even when preheating is not conducted after coating and the next process of applying a finishing coat is performed thereafter; and a coating method using the composition. This aqueous coating composition is characterized by comprising an aqueous dispersion of a modified polyolefin (A), an aqueous acrylic resin (B) and a blocked polyisocyanate compound having a specific blocked isocyanate (C).

10 Claims, No Drawings

(56) References Cited

FOREIGN PATENT DOCUMENTS

| JP | 10-296171 A | 11/1998 |
|----|----|----|
| JP | 2002322238 A | 11/2002 |
| JP | 2004331911 A | 11/2004 |
| JP | 2007302709 A | 11/2007 |
| JP | 2009155409 A | 7/2009 |
| JP | 2010150459 A | 7/2010 |
| WO | 2007066827 A1 | 6/2007 |
| WO | 2010016617 A1 | 2/2010 |
| WO | 2010018872 A1 | 2/2010 |
| WO | 2012137881 A1 | 10/2012 |
| WO | 2012137884 A1 | 10/2012 |

OTHER PUBLICATIONS

English Abstract and Machine Translation for JP-2009155409, Publication Date: Jul. 16, 2009.
International Search Report for PCT/JP2013/066485 dated Jul. 9, 2013.
English Abstract of WO2007066827, Publication Date: Jun. 14, 2007.
English Abstract and Machine Translation of JP2010150459, Publication Date: Jul. 8, 2010.
English Abstract and Machine Translation of 2007302709, Publication Date: Nov. 22, 2007.
English Abstract and Machine Translation JPH10296171, Publication Date: Nov. 10, 1998.
English Abstract and Machine Translation of JP2004331911, Publication Date: Nov. 25, 2004.

\* cited by examiner

AQUEOUS COATING COMPOSITION AND COATING METHOD USING SAME

TECHNICAL FIELD

The present invention relates to an aqueous coating composition capable of forming a multilayer coating film that demonstrates superior adhesion to a plastic base material as well as superior finish quality and moisture resistance without preheating after coating and without exhibiting layer mixing even if top-coating is carried out in a subsequent step, and to a coating method that uses this composition.

BACKGROUND ART

Polyolefin and other plastic molded articles are frequently used as members of automobile exterior panels, home appliances and the like. These molded articles are often pre-coated with a primer containing a chlorinated polyolefin and the like in order to improve adhesion between a top-coating and the molded article. Although toluene, xylene or other aromatic organic solvents have been used in this primer from the viewpoint of solubility of the chlorinated polyolefin, the use of aqueous primers has been promoted in recent years from the viewpoints of safety, health and protecting the environment.

Patent Document 1 and Patent Document 2 propose an example of an aqueous primer in the form of a composition comprising, at a specific ratio, a crosslinking agent and at least one type of aqueous resin selected from the group consisting of an aqueous polyolefin resin, an aqueous polyurethane resin and an aqueous acrylic resin for the purpose of forming a coating film that demonstrates superior adhesion with a polyolefin or other plastic molded article.

In addition, Patent Documents 3 and 4 propose an example of a 3-coat, 1-bake coating system, including top-coating, that consists of coating an aqueous primer followed by sequentially coating a colored base coating material and a clear coating material. In the case of using an aqueous primer in this type of wet-on-wet method, it is necessary to preliminarily dry (preheat) the aqueous primer after coating for, for example, several minutes prior to proceeding to the next coating step in order to ensure finish quality following top-coating.

However, actual coating lines are required to eliminate preheating steps and lower baking temperatures from the viewpoints of saving on space and energy, and as a result thereof, if the film thickness of the primer is reduced in an attempt to accelerate drying, a defective finished appearance may occur accompanying defective film formation depending on the environment in the coating booth (and particularly under low humidity conditions of a relative humidity of 65% or lower), and the additional problem may occur whereby it is not possible to secure electrical conductivity due to defective film formation. Moreover, in the case of multilayer coating films, it is difficult to eliminate the preheating step not only from the viewpoint of finish quality after top-coating, but also from the viewpoint of moisture resistance and other physical properties of the coating film.

Therefore, the present applicant proposed in Patent Document 5 that, by using an aqueous primer composition containing specific amounts of an aqueous dispersion of a modified polyolefin, an aqueous urethane resin and/or aqueous acrylic resin and a specific diester compound, a multilayer coating film can be formed that demonstrates superior finish quality and moisture resistance without preheating after coating and without exhibiting layer mixing even if top-coating is carried out in a subsequent step.

CITATION LIST

Patent Documents

Patent Document 1 International Publication No. WO 2007/066827
Patent Document 2 Japanese Unexamined Patent Publication No. 2007-302709
Patent Document 3 Japanese Unexamined Patent Publication No. H10-296171
Patent Document 4 Japanese Unexamined Patent Publication No. 2004-331911
Patent Document 5 International Publication No. WO 2010/016617

SUMMARY OF INVENTION

Technical Problem

However, even according to the aqueous primer composition described in Patent Document 5, in the case the primer coating film is a thick film or when using an aqueous base coat coating material for the top-coat, there was the problem of a decrease in moisture resistance of a multilayer coating film depending on the type thereof.

Thus, an object of the present invention is to provide an aqueous coating composition that is capable of forming a multilayer coating film that demonstrates superior adhesion to a plastic base material and demonstrates superior finish quality and moisture resistance without preheating after coating and without exhibiting layer mixing even if top-coating is carried out in a subsequent step, and to provide a coating method that uses that composition.

Solution to Problems

As a result of conducting extensive studies to solve the aforementioned problems, the inventors of the present invention found that the aforementioned problems can be solved by using an aqueous coating composition that contains a specific amount of a specific blocked polyisocyanate compound, thereby leading to completion of the present invention.

Namely, the present invention relates to an aqueous coating composition that contains an aqueous dispersion of a modified polyolefin (A), an aqueous acrylic resin (B), and a blocked polyisocyanate compound (C) having at least one type of blocked isocyanate group selected from the group consisting of a blocked isocyanate group represented by the following general formula (I):

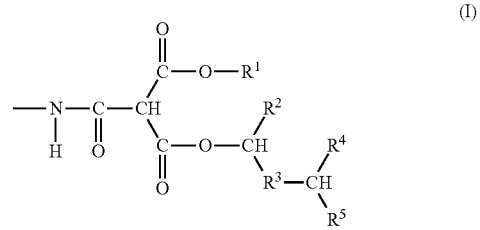

(wherein, $R^1$, $R^2$, $R^4$ and $R^5$ independently represent a hydrocarbon group having 1 to 12 carbon atoms, and $R^3$ represents a linear or branched alkylene group having 1 to 12 carbon atoms), a blocked isocyanate group represented by the following general formula (II):

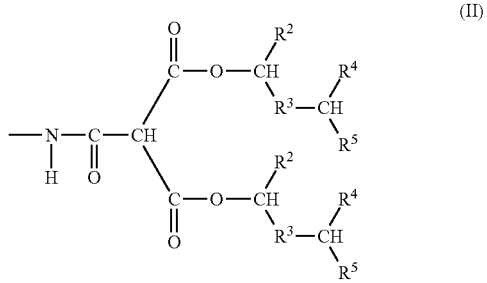

(wherein, $R^2$, $R^3$, $R^4$ and $R^5$ are the same as previously defined), and a blocked isocyanate group represented by the following general formula (III):

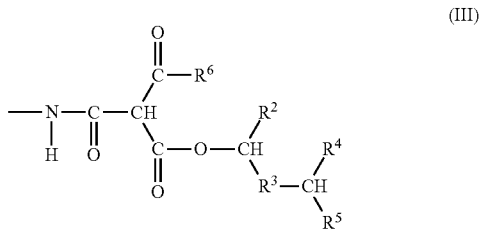

(wherein, $R^2$, $R^3$, $R^4$ and $R^5$ are the same as previously defined and $R^6$ represents a hydrocarbon group having 1 to 12 carbon atoms).

Advantageous Effect of Invention

According to the present invention, by using an aqueous coating composition containing a specific compound, a multilayer coating film can be formed that demonstrates superior adhesion to a plastic base material and demonstrates superior finish quality and moisture resistance without preheating after coating and without exhibiting layer mixing even if top-coating is carried out in a subsequent step, while also enabling the formation of a multilayer coating film that demonstrates superior finish quality, moisture resistance and durability even under low-temperature baking conditions in a 3-coat, 1-bake system.

DESCRIPTION OF EMBODIMENTS

The aqueous coating composition of the present invention contains an aqueous dispersion of a modified polyolefin (A), an aqueous acrylic resin (B) and a blocked polyisocyanate compound (C).

[Aqueous Dispersion of Modified Polyolefin (A)]

The aqueous dispersion of a modified polyolefin (A) used in the present invention is formed by dispersing a polyolefin (i) modified by an unsaturated carboxylic acid or acid anhydride thereof (to also be referred to as "unsaturated carboxylic acid or acid anhydride-modified polyolefin (i)") in an aqueous medium.

The unsaturated carboxylic acid or acid anhydride-modified polyolefin (i) can be obtained by graft polymerization in accordance with a known method using a polyolefin, obtained by (co)polymerizing at least one type of olefin selected from the group consisting of olefins having 2 to 10 carbon atoms, and particularly 2 to 4 carbon atoms, such as ethylene, propylene, butylene or hexane, and further using an unsaturated carboxylic acid having 3 to 10 carbon atoms, and particularly 4 to 8 carbon atoms, such as (meth)acrylic acid, maleic acid, fumaric acid or itaconic acid (and preferably an unsaturated mono- or dicarboxylic acid) or an anhydride of these unsaturated carboxylic acids.

The unsaturated carboxylic acid or acid anhydride-modified polyolefin (i) is preferably that which has been modified by maleic acid or an acid anhydride thereof. There are no particular limitations on the amount grafted by the unsaturated carboxylic acid or acid anhydride thereof, and although it can be varied corresponding to the desired physical properties of the coating film formed, it is typically within the range of 1% by weight to 20% by weight, preferably within the range of 1.5% by weight to 15% by weight and more preferably within the range of 2% by weight to 10% by weight based on the solid content weight of the polyolefin.

The aforementioned unsaturated carboxylic acid or acid anhydride-modified polyolefin (i) may be further subjected to acrylic modification. Examples of polymerizable unsaturated monomers able to be used for the acrylic modification include alkyl esters of (meth)acrylic acid such as methyl (meth)acrylate, ethyl(meth)acrylate, propyl(meth)acrylate, butyl(meth)acrylate, hexyl(meth)acrylate, cyclohexyl(meth)acrylate, 2-ethylhexyl(meth)acrylate, lauryl(meth)acrylate or stearyl(meth)acrylate, acrylic monomers such as (meth)acrylic acid, glycidyl(meth)acrylate, 2-hydroxyethyl(meth)acrylate, (meth)acrylamide or (meth)acrylonitrile, and styrene, and these can each be used alone or two or more types can be used in combination.

Furthermore, in the present description, "(meth)acrylic" refers to acrylic or methacrylic, while "(meth)acrylate" refers to acrylate or methacrylate.

An example of a method for carrying out the aforementioned acrylic modification consists of first reacting glycidyl (meth)acrylate, which has reactivity with respect to a carboxyl group present in the modified polyolefin, with the carboxylic acid or acid anhydride-modified polyolefin to introduce a polymerizable unsaturated group, followed by copolymerizing at least one other type of monomer with the unsaturated carboxylic acid or acid anhydride-modified polyolefin introduced with the polymerizable unsaturated group. The amount of the aforementioned polymerizable unsaturated monomer used in the case of acrylic modification is preferably within the range of 30% by weight or less, particularly preferably within the range of 0.1% by weight to 20% by weight, and more particularly preferably within the range of 0.15% by weight to 15% by weight based on the solid content weight of the resulting unsaturated carboxylic acid or acid anhydride-modified polyolefin (i) from the viewpoints of compatibility with other components and adhesiveness of the coating film formed.

In addition, the aforementioned unsaturated carboxylic acid or acid anhydride-modified polyolefin (i) may also be modified with a compound having a polyoxyalkylene chain as desired from the viewpoints of moisture resistance, finish quality and gasohol resistance of the coating film formed. Examples of the polyoxyalkylene chain in a compound having a polyoxyalkylene chain include a polyoxyethylene chain, polyoxypropylene chain and a blocked chain of polyoxyethylene and polyoxypropylene.

The compound having a polyoxyalkylene chain has a number average molecular weight normally within the range of 400 to 3,000 and preferably within the range of 500 to 2,000. If the number average molecular weight is less than 400, the compound is unable to adequately demonstrate the effect as a hydrophilic group resulting in the possibility of having a detrimental effect on coating film performance (and particularly moisture resistance), while if the number average molecular weight exceeds 3,000, the compound solidifies at room temperature resulting in poor solubility and difficulty in handling.

In addition, the aforementioned unsaturated carboxylic acid or acid anhydride-modified polyolefin (i) may also be chlorinated as desired. Polyolefins can be chlorinated by, for example, blowing chlorine gas into an organic solvent solution or dispersion of the polyolefin or modification product thereof, and the reaction temperature can be within the range of 50° C. to 120° C. Although the chlorine content in the chlorinated polyolefin (solid content) can be varied corresponding to the desired physical properties and the like of the chlorinated polyolefin, from the viewpoint of adhesiveness of the coating film formed, the chlorine content is typically within the range of 35% by weight or less, particularly preferably within the range of 10% by weight to 30% by weight, and more particularly preferably within the range of 12% by weight to 25% by weight based on the weight of the chlorinated polyolefin.

The polyolefin used in the aforementioned unsaturated carboxylic acid or acid anhydride-modified polyolefin (i) particularly preferably contains propylene as a polymerization unit thereof, and the weight percentage of propylene in the unsaturated carboxylic acid or acid anhydride-modified polyolefin (i) is normally within the range of 0.5 to 0.99, particularly preferably within the range of 0.6 to 0.97 and more particularly preferably within the range of 0.7 to 0.95 from the viewpoints of compatibility with other components and adhesiveness of the coating film formed.

The unsaturated carboxylic acid or acid anhydride-modified polyolefin (i) obtained in the manner described above can have a weight average molecular weight (Mw) typically within the range of 30,000 to 180,000, preferably within the range of 50,000 to 150,000 and more preferably within the range of 70,000 to 120,000. If the weight average molecular weight of the modified polyolefin is outside these ranges, compatibility with other components and interlayer adhesion between the coating film formed and a base material or top-coating layer decrease, thereby making this undesirable.

The weight average molecular weight and number average molecular weight of the unsaturated carboxylic acid or acid anhydride-modified polyolefin (i) are values that have been determined by respectively converting the weight average molecular weight and number average molecular weight measured by gel permeation chromatography based on the weight average molecular weight and number average molecular weight of polystyrene, and are measured with the "HLC/GPC150C" (trade name, Waters Corp., 60 cm×1) at a column temperature of 135° C. and flow rate of 1.0 ml/min using o-dichlorobenzene for the solvent. The injected sample is prepared by dissolving for 1 to 3 hours at 140° C. to a solution concentration of 5 mg of modified polyolefin in 3.4 ml of o-dichlorobenzene. Furthermore, an example of the column used in gel permeation chromatography is the "GMH$_{HR}$-H(S)HT" (trade name, Tosoh Corp.).

The aqueous dispersion of the modified polyolefin (A) used in the present invention can be obtained by dispersing the aforementioned unsaturated carboxylic acid or acid anhydride-modified polyolefin (i) in an aqueous medium such as deionized water, and at that time, all or a portion of the carboxyl groups in the unsaturated carboxylic acid or acid anhydride-modified polyolefin (i) can be neutralized with an amine compound and/or dispersed in water using an emulsifier. In the case the unsaturated carboxylic acid or acid anhydride-modified polyolefin (i) has a polyoxyalkylene chain, the unsaturated carboxylic acid or acid anhydride-modified polyolefin (i) can be dispersed in an aqueous medium without using the amine compound or emulsifier or only using a small amount thereof.

Examples of the aforementioned amine compound include tertiary amines such as triethylamine, tributylamine, dimethylethanolamine or triethanolamine, secondary amines such as diethylamine, dibutylamine, diethanolamine or morpholine, and primary amines such as propylamine or ethanolamine.

Normally, the amount of the aforementioned amine compound used in the case of the use thereof is preferably within the range of 0.1 to 1.0 mole equivalents based on the carboxyl groups present in the aforementioned unsaturated carboxylic acid or acid anhydride-modified polyolefin (i).

Examples of the aforementioned emulsifier include nonionic emulsifiers such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate or polyoxyethylene sorbitan monolaurate, and anionic emulsifiers such as sodium salts and ammonium salts of alkylsulfonic acids, alkylbenzenesulfonic acids or alkyl phosphates, and polyoxyalkylene group-containing anionic emulsifiers, having an anionic group and a polyoxyalkylene group such as a polyoxyethylene group or polyoxypropylene group in a molecule thereof, or reactive anionic emulsifiers, having the anionic group and a polymerizable unsaturated group in a molecule thereof, can also be used. These can each be used alone or two or more types can be used in combination.

Normally, the amount of the aforementioned emulsifier used is preferably within the range of 30 parts by weight or less and particularly preferably within the range of 0.5 parts by weight to 25 parts by weight based on 100 parts by weight of the solid content weight of the aforementioned unsaturated carboxylic acid or acid anhydride-modified polyolefin (i).

[Aqueous Acrylic Resin (B)]

The aqueous acrylic resin (B) used in the present invention is normally obtained by copolymerizing a monomer mixture composed of a hydrophilic group-containing polymerizable unsaturated monomer such as a carboxyl group-containing polymerizable unsaturated monomer with other polymerizable unsaturated monomers, and examples thereof include a water-soluble acrylic resin having a weight average molecular weight normally within the range of 5,000 to 100,000 and preferably within the range of 5,000 to 50,000, and a dispersoid in the form of granules of an acrylic resin emulsion having a weight average molecular weight of 50,000 or more and preferably 100,000 or more.

The weight average molecular weight and number average molecular weight of the aqueous acrylic resin (B) are values that have been respectively determined by converting weight average molecular weight and number average molecular weight measured by gel permeation chromatography based on the weight average molecular weight and number average molecular weight of polystyrene. The "HLC8120GPC" (trade name, Tosoh Corp.) can be used for the gel permeation chromatography apparatus and four columns consisting of the "TSKgel G-4000H×L", "TSKgel G-3000HxL", "TSKgel G-2500HxL" and "TSKgel G-2000HxL" (all trade names, Tosoh Corp.) can be used for the columns used for gel permeation chromatography.

Furthermore, in the present description, the number average molecular weights of materials other than the unsaturated carboxylic acid or acid anhydride-modified polyolefin (i) and aqueous acrylic resin (B), such as the number average molecular weight of a compound having a polyoxyalkylene chain, a polyisocyanate compound (c1), an active hydrogen-containing compound having a nonionic hydrophilic group, the blocked polyisocyanate compound (C) or a hydroxyl group-containing polyester resin, are values determined using the same method as that used to determine the number average molecular weight of the aforementioned aqueous acrylic resin (B).

Examples of the aforementioned carboxyl group-containing polymerizable unsaturated monomer include (meth) acrylic acid, crotonic acid, maleic acid, fumaric acid, itaconic acid and monoalkyl hemiesters of dicarboxylic acids thereof, while examples of hydrophilic group-containing polymerizable unsaturated monomers other than those listed above include polyalkylene chain-containing polymerizable monomers such as polyethylene glycol(meth)acrylate, polypropylene glycol(meth)acrylate, methoxypolyethylene glycol(meth)acrylate or ethoxypolyethylene glycol (meth)acrylate, sulfonic acid group-containing polymerizable unsaturated monomers such as 2-acrylamido-2-methylpropane sulfonic acid or sulfoalkyl(meth)acrylates such as 2-sulfoethyl(meth)acrylate, tertiary amino group-containing polymerizable unsaturated monomers such as N,N-dimethylaminoethyl(meth)acrylateor N,N-diethylaminoethyl(meth)acrylate, quaternary ammonium salt group-containing polymerizable unsaturated monomers such as 2-(methacryloyloxy)ethyltrimethyl ammonium chloride or 2-(methacryloyloxy)ethyltrimethyl ammonium bromide, and quaternary ammonium salt carboxyl group-containing polymerizable unsaturated monomers.

Examples of the aforementioned other polymerizable unsaturated monomers include alkyl esters or cycloalkyl esters of acrylic acid or methacrylic acid having 1 to 24 carbon atoms such as methyl (meth)acrylate, ethyl(meth) acrylate, n- or isopropyl(meth)acrylate, n-, iso- or tert-butyl (meth)acrylate, 2-ethylhexyl(meth)acrylate, cyclohexyl (meth)acrylate, lauryl(meth)acrylate or isobornyl(meth) acrylate, hydroxyalkyl esters of acrylic acid or methacrylic acid such as 2-hydroxyethyl (meth)acrylate, 2- or 3-hydroxypropyl(meth)acrylate or 4-hydroxybutyl(meth)acrylate, as well as glycidyl(meth)acrylate, acrylonitrile, acrylamide, styrene, vinyl toluene, vinyl acetate, vinyl chloride and 1,6-hexanediol diacrylate, and each of these can be used alone or two or more types can be used in combination.

There are no particular limitations on the method used to copolymerize the aforementioned monomer mixture and can be carried out using a known method, and for example, a water-soluble acrylic resin can be copolymerized by a method such as solution polymerization, while an acrylic resin emulsion can be copolymerized by a method such as emulsion polymerization.

In the case the aqueous acrylic resin (B) is a dispersoid (granules) of an acrylic resin emulsion obtained by emulsion polymerization in particular, the dispersoid may be emulsion particles having a multilayer structure obtained by emulsion polymerization in multiple stages using the monomer mixture in the presence of water and an emulsifier.

An acidic group such as a carboxyl group derived from a hydrophilic group-containing polymerizable unsaturated monomer present in the aqueous acrylic resin (B) can be neutralized using a basic substance as desired. The basic substance able to be used at that time is preferably water-soluble, examples thereof include ammonia, methylamine, ethylamine, propylamine, butylamine, dimethylamine, trimethylamine, triethylamine, ethylenediamine, morpholine, methylethanolamine, dimethylethanolamine, diethanolamine, triethanolamine, diisopropanolamine and 2-amino-2-methylpropanol, and each of these can be used alone or two or more types can be used in combination.

The aqueous acrylic resin (B) preferably contains a hydroxyl group, and preferably has a hydroxyl group having a hydroxyl value typically within the range of 20 mgKOH/g to 200 mgKOH/g and particularly within the range of 20 mgKOH/g to 150 mgKOH/g from the viewpoints of water dispersibility, compatibility with other components and curability of the coating film formed. In addition, the aqueous acrylic resin (B) preferably has an acid value typically within the range of 1 mgKOH/g to 100 mgKOH/g and particularly within the range of 10 mgKOH/g to 70 mgKOH/g.

In the present invention, the usage ratio of the aqueous dispersion (A) and the aqueous acrylic resin (B) in terms of the solid content weight ratio of an aqueous dispersion of the modified polyolefin (A)/aqueous acrylic resin (B) is typically within the range of 5/95 to 80/20, particularly preferably within the range of 10/90 to 75/25 and more particularly preferably within the range of 15/85 to 75/25. If outside these ranges, adhesion of the coating film formed to the base material, moisture resistance and gasohol resistance decrease, thereby making this undesirable.

[Blocked Polyisocyanate Compound (C)]

The blocked polyisocyanate compound (C) used in the present invention is a blocked polyisocyanate compound having at least one type of blocked isocyanate group selected from the group consisting of a blocked isocyanate group represented by the following general formula (I):

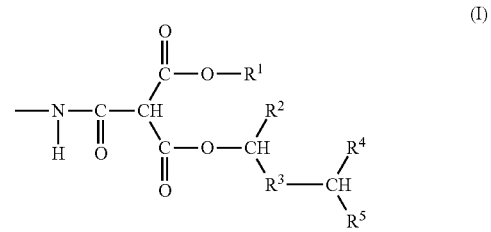

(wherein, $R^1$, $R^2$, $R^4$ and $R^5$ respectively and independently represent a hydrocarbon group having 1 to 12 carbon atoms, and $R^3$ represents a linear or branched alkylene group having 1 to 12 carbon atoms), a blocked isocyanate group represented by the following general formula (II):

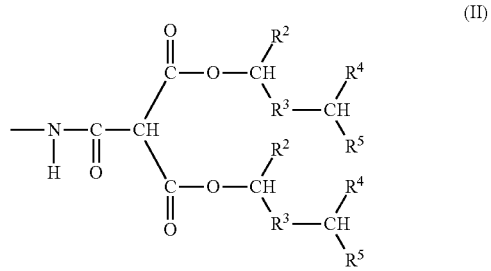

(wherein, $R^2$, $R^3$, $R^4$ and $R^5$ are the same as previously defined), and a blocked isocyanate group represented by the following general formula (III):

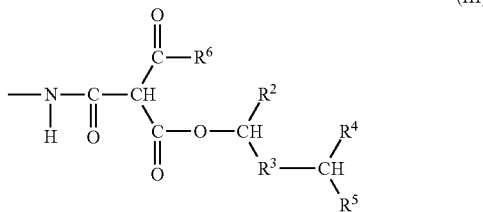

(wherein, $R^2$, $R^3$, $R^4$ and $R^5$ are the same as previously defined and $R^6$ represents a hydrocarbon group having 1 to 12 carbon atoms).

The aforementioned blocked polyisocyanate compound (C) can be obtained by, for example, reacting an active methylene compound (c2) with an isocyanate group present in a polyisocyanate compound (c1) having two or more isocyanate groups in a molecule thereof to obtain a blocked polyisocyanate compound (c3), followed by reacting the resulting blocked polyisocyanate compound (c3) with a secondary alcohol (c4).

[Polyisocyanate Compound (c1)]

The polyisocyanate compound (c1) is a compound having at least two isocyanate groups in a molecule thereof, and examples thereof include an aliphatic polyisocyanate (c11), an alicyclic polyisocyanate (c12), an aromatic-aliphatic polyisocyanate (c13), an aromatic polyisocyanate (c14), a polyisocyanate derivative (c15), a polyisocyanate prepolymer (c16) and a polymer of an isocyanate group-containing polymerizable unsaturated monomer (c17).

Examples of the aliphatic polyisocyanate (c11) include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate or methyl 2,6-diisocyanatohexanoate (common name: lysine diisocyanate), and aliphatic triisocyanates such as 2-isocyantoethyl 2,6-diisocyanatohexanoate, 1,6-diisocyanato-3-isocyanatomethylhexane, 1,4,8-triisocyantooctane, 1,6,11-triisocyanatoundecane, 1,8-diisocyanato-4-isocyanatomethyloctane, 1,3,6-triisocyanatohexane or 2,5,7-trimethyl-1,8-diisocyanato-5-isocyanatomethyloctane.

Examples of the alicyclic polyisocyanate (c12) include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or a mixture thereof, methylenebis(4,1-cyclohexanediyl) diisocyanate (common name: hydrogenated MDI) or norbornane diisocyanate, and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane or 6-(2-isocyanatoethyl)-2-isocyanatomethyl-2-(3-isocyanatopropyl)-bicyclo(2.2.1)heptane.

Examples of the aromatic-aliphatic polyisocyanate (c13) include aromatic-aliphatic diisocyanates such as methylenebis(4,1-phenylene) diisocyanate (common name: MDI), 1,3- or 1,4-xylylene diisocyanate or a mixture thereof, ω,ω-diisocyanato-1,4-diethylbenzene or 1,3- or 1,4-bis(1-isocyanato-methylethyl)benzene (common name: tetramethylxylylene diisocyanate) or a mixture thereof, and aromatic-aliphatic triisocyanates such as 1,3,5-triisocyanatomethylbenzene.

Examples of the aromatic polyisocyanate (c14) include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI), 2,6-tolylene diisocyanate (common name: 2,6-TDI) or a mixture thereof, 4,4'-toluidine diisocyanate or 4,4'-diphenyl ether diisocyanate, and aromatic triisocyanates such as triphenylmethane-4,4',4"-triisocyanate, 1,3,5-triisocyanatobenzene or 2,4,6-triisocyanatotoluene, and aromatic tetraisocyanates such as 4,4'-diphenylmethane-2,2'5,5'-tetraisocyanate.

In addition, examples of the polyisocyanate derivative (c15) include dimers, trimers, biurets, allophanates urethodiones, urethoimines, isocyanurates, oxadiazinetriones, polymethylene polyphenyl polyisocyanurates (crude MDI, polymeric MDI) and crude TDI of the aliphatic polyisocyanate (c11), alicyclic polyisocyanate (c12), aromatic-aliphatic polyisocyanate (c13), aromatic polyisocyanate (c14) and any combinations thereof.

In addition, examples of the polyisocyanate prepolymers (c16) include prepolymers obtained by reacting the aliphatic polyisocyanate (c11), alicyclic polyisocyanate (c12), aromatic-aliphatic polyisocyanate (c13), aromatic polyisocyanate (c14), polyisocyanate derivative (c15) and any combinations thereof with a compound having a group capable of reacting with an isocyanate group under conditions in which the isocyanate group is in excess. Examples of the aforementioned compound having a group capable of reacting with an isocyanate group include compounds having an active hydrogen group such as a hydroxyl group or amino group, and specific examples thereof include polyvalent alcohols, low molecular weight polyester resins, amines and water.

In addition, examples of the polymer of an isocyanate group-containing polymerizable unsaturated monomer (c17) include (co)polymers of polymerizable unsaturated monomers having one type or a plurality of types of isocyanate groups, and copolymers of a copolymerizable unsaturated monomer having one type or a plurality of types of isocyanate groups and one type or a plurality of types of polymerizable unsaturated monomers other than the isocyanate group-containing polymerizable unsaturated monomer.

One type of the polyisocyanate compound (c1) may be used alone or two or more types may be used in combination. In addition, the polyisocyanate compound (c1) is preferably an aliphatic diisocyanate, alicyclic diisocyanate or derivative thereof since there is less likelihood of the occurrence of yellowing when heating the resulting blocked polyisocyanate compound. Among these, the polyisocyanate compound (c1) is more preferably an aliphatic diisocyanate or derivative thereof from the viewpoint of improving flexibility of the coating film formed.

The number average molecular weight of the aforementioned polyisocyanate compound (c1) is preferably within the range of 300 to 20,000, more preferably within the range of 400 to 8,000 and even more preferably within the range of 500 to 2,000 from the viewpoints of reactivity of the resulting blocked polyisocyanate compound (C) and compatibility between the blocked polyisocyanate compound (C) and other coating components.

In addition, the average number of isocyanate functional groups in a single molecule of the aforementioned polyisocyanate compound (c1) is preferably within the range of 2 to 100 from the viewpoints of reactivity of the resulting blocked polyisocyanate compound (C) and compatibility between the blocked polyisocyanate compound (C) and other coating components. The lower limit thereof is more preferably 3 from the viewpoint of enhancing reactivity of the resulting blocked polyisocyanate compound. The upper limit thereof is more preferably 20 from the viewpoint of preventing gelling during production of the blocked polyisocyanate compound (C).

[Active Methylene Compound (c2)]

Examples of the active methylene compound (c2), which blocks isocyanate groups in the aforementioned polyisocyanate compound (c1), include malonic acid diesters such as dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate, di(2-ethylhexyl) malonate, methylisopropyl malonate, ethylisopropyl malonate, methyl-n-butyl malonate, ethyl-n-butyl malonate, methylisobutyl malonate, ethylisobutyl malonate, methyl-sec-butyl malonate, ethyl-sec-butyl malonate, diphenyl malonate or dibenzyl malonate, acetoacetic acid esters such as methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate or benzyl acetoacetate, and isobutyrylacetic acid esters such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate or benzyl isobutyrylacetate, and these can be used alone or two or more types can be used in combination.

Among these, the active methylene compound (c2) is preferably at least one compound selected from the group consisting of dimethyl malonate, diethyl malonate, diisopropyl malonate, methyl acetoacetate, ethyl acetoacetate, methyl isobutyrylacetate and ethyl isobutyrylacetate, and more preferably at least one type of compound selected from the group consisting of diisopropyl malonate, methyl isobutyrylacetate and ethyl isobutyrylacetate, from the viewpoint of the finish quality of the coating film formed by the aqueous coating composition containing the resulting blocked polyisocyanate compound (C). In particular, the active methylene compound (c2) is even more preferably diisopropyl malonate from the viewpoints of the reactivity and storage stability of the resulting blocked polyisocyanate compound (C) and the finish quality of the coating film formed by the aqueous coating composition containing the blocked polyisocyanate compound (C).

A reaction catalyst can be used in the blocking reaction of an isocyanate group by the aforementioned active methylene compound (c2) as desired. Examples of the reaction catalyst include basic compounds such as metal hydroxides, metal alkoxides, metal carboxylates, metal acetylacetinates, hydroxides of onium salts, onium carboxylates, metal salts of active methylene compounds, onium salts of active methylene compounds, aminosilanes, amines or phosphines. The aforementioned onium salts are preferably ammonium salts, phosphonium salts or sulfonium salts. Normally, the amount of reaction catalyst used is preferably within the range of 10 ppm to 10,000 ppm and more preferably within the range of 20 ppm to 5,000 ppm based on the total solid content weight of the polyisocyanate compound (c1) and the active methylene compound (c2).

In addition, the blocking reaction of an isocyanate group by the aforementioned active methylene compound (c2) can be carried out at 0° C. to 150° C. and a solvent may be used. The aforementioned solvent is preferably an aprotic solvent and particularly preferably an ester, ether, N-alkylamide or ketone. Once the reaction has proceeded as desired, the reaction may be stopped by neutralizing the catalyst in the form of a basic compound by adding an acid component.

In the blocking reaction of an isocyanate group by the active methylene compound (c2), although there are no particular limitations thereon, the amount of the active methylene compound (c2) used is 0.1 mole to 3 moles and preferably 0.2 moles to 2 moles based on 1 mole of isocyanate groups in the polyisocyanate compound (c1). In addition, the active methylene compound that has not reacted with isocyanate groups in the polyisocyanate compound (c1) can be removed following completion of the blocking reaction.

In addition, a portion of isocyanate groups present in the aforementioned polyisocyanate compound (c1) may also be reacted with an active hydrogen-containing compound. Allowing a portion of the isocyanate groups in the polyisocyanate compound (c1) to react with an active hydrogen-containing compound makes it possible to improve storage stability of the resulting blocked polyisocyanate compound (C), adjust the compatibility between the blocked polyisocyanate compound (C) and other coating components, and improve the flexibility of the coating film formed.

Examples of the aforementioned active hydrogen-containing compound include hydroxyl group-containing compounds and amino group-containing compounds.

Examples of the aforementioned hydroxyl group-containing compounds include propanol, butanol, pentanol, hexanol, heptanol, 2-ethyl-1-hexanol, octanol, nonanol, decanol, tridecanol, stearyl alcohol, ethylene glycol, propylene glycol, polyethylene glycol, polypropylene glycol, polyethylene glycol(propylene glycol), polyethylene glycol monoalkyl ether, polypropylene glycol monoalkyl ether, polyethylene glycol(propylene glycol)monoalkyl ether and trimethylolpropane, and these can be used alone or two or more types can be used in combination.

Furthermore, in the present description, "polyethylene glycol(propylene glycol)" refers to a copolymer of ethylene glycol and propylene glycol, and includes both block copolymers and random copolymers.

Among these, the aforementioned hydroxyl group-containing compound is preferably a monovalent alcohol from the viewpoint of inhibiting excessively high viscosity of the resulting blocked polyisocyanate compound (C). Examples of the monovalent alcohol include propanol, butanol, pentanol, hexanol, heptanol, 2-ethyl-1-hexanol, octanol, nonanol, decanol, tridecanol, stearyl alcohol, polyethylene glycol monoalkyl ether, polypropylene glycol monoalkyl ether and polyethylene glycol(propylene glycol)monoalkyl ether, and these can be used alone or two or more types can be used in combination.

In addition, examples of the aforementioned amino-group containing compounds include butylamine, octylamine, stearylamine, dibutylamine, dioctylamine, dicyclohexylamine, dilaurylamine, α-(aminoalkyl)-ω-alkoxy polyoxyethylene (oxypropylene), hexamethylenediamine, diethylenetriamine and polyoxypropylene-α,ω-diamine (commercially available as, for example, "Jeffamine D-400" manufactured by Huntsman Corp.), and one type of these can be used alone or two or more types can be used in combination.

Among these, the aforementioned amino group-containing compound is preferably a monovalent amine from the viewpoint of inhibiting excessively high viscosity of the resulting blocked polyisocyanate compound (C). Examples of the monovalent amine include butylamine, octylamine, stearylamine, dibutylamine, dioctylamine, dicyclohexylamine, dilaurylamine and α-(aminoalkyl)-ω-alkoxypolyoxyethylene(oxypropylene), and these can be used alone or two or more types can be used in combination.

In the case of reacting a portion of the isocyanate groups in the polyisocyanate compound (c1) with the aforementioned active hydrogen-containing compound, the reaction ratio between the polyisocyanate compound (c1) and the active hydrogen-containing compound is such that the number of moles of active hydrogen in the active hydrogen-containing compound is preferably within the range of 0.03 moles to 0.06 moles based on 1 mole of isocyanate groups in the polyisocyanate compound (c1) from the viewpoints of storage stability and curability of the polyisocyanate compound (c1) and finish quality of the multilayer coating film formed. The upper limit thereof is preferably 0.4 and more preferably 0.3 from the viewpoints of curability of the aqueous coating composition and moisture resistance of the multilayer coating film formed. The lower limit thereof is preferably 0.04 and more preferably 0.05 from the viewpoints of the storage stability of the aqueous coating composition and finish quality of the multilayer coating film formed.

In addition, the aforementioned blocked polyisocyanate compound (C) is preferably a blocked polyisocyanate compound (C') having a hydrophilic group from the viewpoints of storage stability and curability of the aqueous coating composition and finish quality of the multilayer coating film formed.

The aforementioned blocked polyisocyanate compound (C') having a hydrophilic group can be obtained by, for example, using an active hydrogen-containing compound having a hydrophilic group for the aforementioned active hydrogen-containing compound.

Examples of active hydrogen-containing compounds having a hydrophilic group include active hydrogen-containing compounds having a nonionic hydrophilic group, active hydrogen-containing compounds having an anionic hydrophilic group and active hydrogen-containing compounds having a cationic hydrophilic group, and these can be used alone or two or more types can be used in combination. Among these, an active hydrogen-containing compound having a nonionic hydrophilic group is used preferably since there is little likelihood of inhibiting the reaction whereby the active methylene compound (c2) blocks isocyanate groups in the polyisocyanate compound (c1).

An active hydrogen-containing compound having a polyoxyalkylene group, for example, can be preferably used for the aforementioned active hydrogen-containing compound having a nonionic hydrophilic group. Examples of the aforementioned polyoxyalkylene group include a polyoxyethylene group, polyoxypropylene group and polyoxyethylene(oxypropylene) group, and these can be used alone or two or more types can be used in combination. Among these, an active hydrogen-containing compound having a polyoxyethylene group is preferable from the viewpoint of storage stability of the resulting aqueous coating composition.

The aforementioned active hydrogen-containing compound having a polyoxyethylene group preferably has a polyoxyethylene group consisting of 3 or more, preferably 5 to 100 and even more preferably 8 to 45 consecutive oxyethylene groups from the viewpoints of storage stability of the resulting blocked polyisocyanate compound after dispersing in water and moisture resistance of the coating film formed.

In addition, the aforementioned active hydrogen-containing compound having a polyoxyethylene group may also contain an oxyalkylene group other than an oxyethylene group in the consecutive oxyethylene groups. Examples of oxyalkylene groups other than the oxyethylene group include oxypropylene groups and oxybutylene groups. The molar ratio of the oxyethylene group among the oxyalkylene groups in the aforementioned active hydrogen-containing compound having a polyoxyethylene group is preferably within the range of 20 mol % to 100 mol % and more preferably within the range of 50 mol % to 100 mol % from the viewpoint of storage stability of the resulting aqueous coating composition. If the molar ratio of oxyethylene groups among the oxyalkylene groups is less than 20 mol %, the ability to impart hydrophilicity becomes inadequate and the storage stability of the resulting aqueous coating composition may decrease.

In addition, the number average molecular weight of the aforementioned active hydrogen-containing compound having a nonionic hydrophilic group is preferably within the range of 200 to 2,000 from the viewpoints of storage stability of the resulting aqueous coating composition and moisture resistance of the coating film formed. The lower limit of number average molecular weight is preferably 300 and more preferably 400 from the viewpoint of storage stability of the resulting aqueous coating composition. The upper limit thereof is preferably 1,500 and more preferably 1,200 from the viewpoint of moisture resistance of the coating film formed by an aqueous coating composition containing the blocked polyisocyanate compound (C).

Examples of the aforementioned active hydrogen-containing compound having a nonionic hydrophilic group include polyethylene glycol monoalkyl ethers such as polyethylene glycol monomethyl ether or polyethylene glycol monoethyl ether (also known as ω-alkoxypolyoxyethylenes), polypropylene glycol monoalkyl ethers such as polypropylene glycol monomethyl ether or polypropylene glycol monoethyl ether (also known as ω-alkoxypolyoxypropylenes), ω-alkoxypolyoxyethylene(oxypropylenes) such as ω-methoxyoxyethylene(oxypropylene) or ω-ethoxypolyoxyethylene(oxypropylene), polyethylene glycol(propylene glycol)monoalkyl ethers such as polyethylene glycol(propylene)monomethyl ether or polyethylene glycol(propylene)monoethyl ether, as well as polyethylene glycol, polypropylene glycol, polyethylene glycol(propylene glycol), α-(aminoalkyl)-ω-alkoxypolyoxyethylene, α-(aminoalkyl)-ω-alkoxypolyoxypropylene and α-(aminoalkyl)-ω-alkoxypolyoxyethylene(oxypropylene), and these can be used alone or two or more types can be used in combination. Among these, the aforementioned active hydrogen-containing compound having a nonionic hydrophilic group is preferably polyethylene glycol monomethyl ether, polyethylene glycol monoethyl ether or polyethylene glycol, and more preferably polyethylene glycol monomethyl ether.

Furthermore, in the present description, "polyoxyethylene (oxypropylene)" refers to a group having both an oxyethylene unit and an oxypropylene unit, and includes that in which repeating oxyethylene units (blocks), repeating oxypropylene units (blocks) and oxyethylene units and oxypropylene units are randomly arranged.

In addition, examples of commercially available products of the aforementioned polyethylene glycol monomethyl ether include "Uniox M-400", "Uniox M-550", "Uniox M-1000" and "Uniox M-2000" manufactured by NOF Corp. In addition, examples of commercially available products of the aforementioned polyethylene glycol include "PEG #200", "PEG #300", "PEG #400", "PEG #500", "PEG #1000", "PEG #1500", "PEG #1540" and "PEG #2000" manufactured by NOF Corp.

Examples of the aforementioned active hydrogen-containing compound having an anionic hydrophilic group include active hydrogen-containing compounds having a carboxyl group, active hydrogen-containing compounds having a sulfonic acid group and active hydrogen-containing compounds having a phosphoric acid group, and these can be used alone or two or more types can be used in combination. Among these, an active hydrogen-containing compound having a carboxyl group can be used preferably from the viewpoint of compatibility of the resulting blocked polyisocyanate compound (C) with other coating components.

All or a portion of the acid groups of the aforementioned active hydrogen-containing compound having an anionic hydrophilic group are preferably neutralized with a basic compound since there is less likelihood of the active methylene compound (2) being inhibited from blocking isocyanate groups in the polyisocyanate compound (c1).

Neutralization of acid groups in the aforementioned active hydrogen-containing compound having an anionic hydrophilic group may be carried out before or after the reaction between the active hydrogen-containing compound having an anionic hydrophilic group and the aforementioned polyisocyanate compound (c1).

Examples of the aforementioned basic compound include hydroxides of alkaline metals or alkaline earth metals such as sodium hydroxide, potassium hydroxide, lithium hydroxide, calcium hydroxide or barium hydroxide, metal alkoxides, ammonia, primary monoamines such as ethylamine, propylamine, butylamine, benzylamine, monoethanolamine, 2,2-dimethyl-3-amino-1-propanol, 2-aminopropanol, 2-amino-2-methyl-1-propanol or 3-aminopropanol, secondary monoamines such as diethylamine, diethanolamine, di-n-propanolamine, diisopropanolamine, N-methylethanolamine or N-ethylethanolamine, tertiary monoamines such as dimethylethanolamine, trimethylamine, triethylamine, triisopropylamine, methyldiethanolamine or 2-(dimethylamino)ethanol, and polyamines such as diethylenetriamine, hydroxyethylaminoethylamine, ethylaminoethylamine or methylaminopropylamine, and these can each be used alone or two or more types can be used in combination. The amount of the aforementioned basic compound used is normally within the range of 0.1 equivalents to 1.5 equivalents and preferably within the range of 0.2 equivalents to 1.2 equivalents based on the anionic group in the active hydrogen-containing compound having an anionic hydrophilic group.

Examples of the aforementioned active hydrogen-containing compound having a carboxyl group include monohydroxycarboxylic acids such as glycolic acid, lactic acid, hydroxypivalic acid or malic acid, dihydroxycarboxlic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid or 2,2-dimethylolvaleric acid and lactone ring-opening adducts of dihydroxycarboxylic acids thereof, as well as glycine, 1-carboxy-1,5-pentylenediamine, dihydoxybenzoic acid, 3,5-diaminobenzoic acid, lysine and arginine.

Examples of the aforementioned active hydrogen-containing compound having a sulfonic acid group include 2-amino-1-ethanesulfonate, N,N-bis(2-hydroxyethyl)-2-aminoethanesulfonate, 1,3-phenylenediamine-4,6-disulfonic acid, diaminobutanesulfonic acid, 3,6-diamino-2-toluenesulfonate, 2,4-diamino-5-toluenesulfonate, 2-(cyclohexylamino)-ethanesulfoante and 3-(cyclohexylamino)-propanesulfonate.

Examples of the aforementioned active hydrogen-containing compound having a phosphoric acid group include 2,3-dihydroxypropylphenyl phosphate, hydroxyalkylphosphates and aminoalkylphosphonates.

In the case of reacting a portion of the isocyanate groups in the polyisocyanate compound (c1) with the aforementioned active hydrogen-containing compound having a hydrophilic group, the reaction ratio between the polyisocyanate compound (c1) and the active hydrogen-containing compound having a hydrophilic group is such that the number of moles of active hydrogen in the active hydrogen-containing compound based on 1 mole of isocyanate groups in the polyisocyanate compound (c1) is preferably within the range of 0.03 moles to 0.6 moles from the viewpoints of storage stability and curability of the resulting aqueous coating composition, and adhesion, finish quality and moisture resistance of the coating film formed by the aqueous coating composition. The upper limit thereof is preferably 0.4 and more preferably 0.3 from the viewpoints of curability of the resulting aqueous coating composition and moisture resistance of the coating film formed by the aqueous coating composition. The lower limit thereof is preferably 0.04 and more preferably 0.05 from the viewpoints of storage stability of the resulting aqueous coating composition and adhesion, finish quality and moisture resistance of the coating film formed by the aqueous coating composition.

In addition, the blocked polyisocyanate compound (C) can also be imparted with water dispersibility by preliminarily mixing with a surfactant. In this case, the surfactant is preferably a nonionic surfactant and/or anionic surfactant from the viewpoint of stability of the coating material.

[Blocked Polyisocyanate Compound (c3)]

The blocked polyisocyanate compound (c3) is obtained by reacting the polyisocyanate compound (c1), having two or more isocyanate groups in a molecule thereof, with the active methylene compound (c2). The blocked polyisocyanate compound (c3) is normally a blocked polyisocyanate compound in which all or a portion of the isocyanate groups in the polyisocyanate compound (c1) are blocked by the active methylene compound (c2).

In particular, the aforementioned blocked polyisocyanate compound (c3) is preferably at least one of a blocked polyisocyanate compound (c3-1) having a blocked isocyanate group represented by the following general formula (IV):

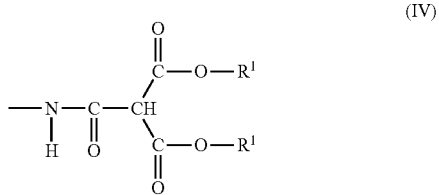

(IV)

(wherein, $R^1$ independently represents a hydrocarbon group having 1 to 12 carbon atoms and may be mutually the same or different), and a blocked isocyanate group represented by the following general formula (V):

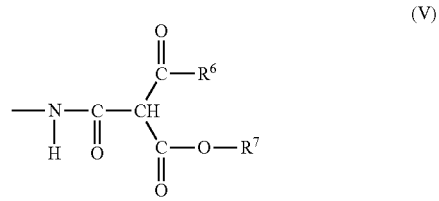

(V)

(wherein, $R^6$ and $R^7$ independently represent a hydrocarbon group having 1 to 12 carbon atoms).

[Blocked Polyisocyanate Compound (c3-1)]

The blocked polyisocyanate compound (c3-1) is a blocked polyisocyanate compound having a blocked isocyanate group represented by general formula (IV).

In particular, $R^1$ is preferably an alkyl group having 1 to 3 carbon atoms from the viewpoint that an active methylene compound, which can be produced comparatively easily, can be used for the active methylene compound (c2) that constitutes one of the raw materials of the blocked polyisocyanate compound. Among these, $R^1$ is preferably an alkyl group having 2 or 3 carbon atoms from the viewpoint of improved compatibility between the resulting blocked polyisocyanate compound (C) and other coating components, and more preferably an isopropyl group from the viewpoints of storage stability of the resulting aqueous coating composition and finish quality of the coating film formed by the aqueous coating composition.

The aforementioned blocked polyisocyanate compound (c3-1) can be obtained by, for example, reacting the polyisocyanate compound (c1) with the active methylene compound (c2) in the form of a dialkyl malonate having a hydrocarbon group having 1 to 12 carbon atoms.

Examples of the aforementioned dialkyl malonate include dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate and di(2-ethylhexyl) malonate, and these can be used alone or two more types can be used in combination. Among these, dimethyl malonate, diethyl malonate, diisopropyl malonate, di-n-butyl malonate, diisobutyl malonate, di-sec-butyl malonate and di-tert-butyl malonate are preferable, diethyl malonate, di-n-propyl malonate and diisopropyl malonate are more preferable, and diisopropyl malonate is even more preferable.

[Blocked Polyisocyanate Compound (c3-2)]

The blocked polyisocyanate compound (c3-2) is a blocked polyisocyanate compound having a blocked isocyanate group represented by general formula (V).

In particular, $R^6$ and $R^7$ are preferably alkyl groups having 1 to 3 carbon atoms from the viewpoint that an active methylene compound, which can be produced comparatively easily, can be used for the active methylene compound (c2) that constitutes one of the raw materials of the blocked polyisocyanate compound. Among these, $R^6$ and $R^7$ are preferably alkyl groups having 2 or 3 carbon atoms from the viewpoint of improved compatibility between the resulting blocked polyisocyanate compound (C) and other coating components, and more preferably isopropyl groups from the viewpoints of storage stability of the resulting aqueous coating composition and finish quality of the coating film formed by the aqueous coating composition.

The aforementioned blocked polyisocyanate compound (c3-2) can be obtained by, for example, reacting the polyisocyanate compound (c1) with the active methylene compound (c2) in the form of an acetoacetic acid ester having a hydrocarbon group having 1 to 12 carbon atoms or an isobutyryl acetic acid ester having a hydrocarbon group having 1 to 12 carbon atoms. In particular, the blocked polyisocyanate compound (c3-2) is preferably obtained by reacting using an isobutyryl acetic acid ester having a hydrocarbon group having 1 to 12 carbon atoms for the active methylene compound (c2).

Examples of the aforementioned isobutyryl acetic acid ester include methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, and these can be used alone or two or more types can be used in combination. Among these, methyl isobutyrylacetate, ethyl isobutyrylacetate and isopropyl isobutyrylacetate are preferable.

In addition, examples of the aforementioned acetoacetic acid ester include methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, and these can be used alone or two or more types can be used in combination. Among these, methyl acetoacetate, ethyl acetoacetate and isopropyl acetoacetate are preferable.

In addition, the blocked polyisocyanate compound (c3) may also be a compound obtained by reacting the polyisocyanate compound (c1) having two or more isocyanate groups in a molecule thereof, the active methylene compound (c2), and the aforementioned active hydrogen-containing compound. More specifically, by using, for example, the aforementioned active hydrogen-containing compound having a polyoxyalkylene group for the aforementioned active hydrogen-containing compound, a blocked polyisocyanate compound can be produced in which a portion of the isocyanate groups in the polyisocyanate compound (c1) are blocked by the active methylene compound (c2), and all or a portion of other isocyanate groups have reacted with the active hydrogen-containing compound having a polyoxyalkylene group.

In the present invention, the blocked polyisocyanate compound (C) can be obtained by, for example, reacting the aforementioned blocked polyisocyanate compound (c3) with a secondary alcohol (c4) represented by the following general formula (VI):

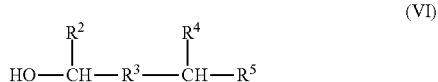

(wherein, $R^2$, $R^4$ and $R^5$ independently represent a hydrocarbon group having 1 to 12 carbon atoms, and $R^3$ represents a linear or branched alkylene group having 1 to 12 carbon atoms).

[Secondary Alcohol (c4)]

The secondary alcohol (c4) is a compound represented by general formula (VI). In particular, $R^2$ is preferably a methyl group from the viewpoints of enhancing reactivity between the blocked polyisocyanate compound (c3) and the aforementioned secondary alcohol (c4). In addition, if the number of carbon atoms of each of $R^3$, $R^4$ and $R^5$ is large, the polarity of the resulting blocked polyisocyanate compound decreases, and since there are cases in which compatibility with other coating components may decrease, $R^3$ is preferably an alkylene group having 1 to 3 carbon atoms and $R^4$ and $R^5$ are preferably methyl groups.

Examples of the aforementioned secondary alcohol (c4) include 4-methyl-2-pentanol, 5-methyl-2-hexanol, 6-methyl-2-heptanol and 7-methyl-2-octanol, and these can be used alone or two or more types can be used in combination. Among these, 4-methyl-2-pentanol, having a comparatively low boiling point, is more preferable when distilling off all or a portion of unreacted secondary alcohol (c4) since the secondary alcohol (c4) is removed comparatively easily.

More specifically, the blocked polyisocyanate compound (C) can be obtained by reacting the blocked polyisocyanate compound (c3-1), described in the explanation of the blocked polyisocyanate compound (c3) and having a blocked isocyanate group represented by the following general formula (IV):

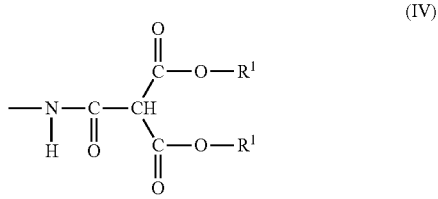

(wherein, $R^1$ independently represents a hydrocarbon group having 1 to 12 carbon atoms and may be mutually the same or different), with the secondary alcohol (c4).

In this case, at least one $R^4$ in the blocked isocyanate group in the aforementioned blocked polyisocyanate compound (c3-1) is substituted with a group represented by the following general formula (VII):

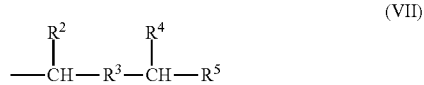

(wherein, $R^2$, $R^4$ and $R^5$ independently represent a hydrocarbon group having 1 to 12 carbon atoms and $R^3$ represents a linear or branched alkylene group having 1 to 12 carbon atoms).

In addition, in this case, the resulting blocked polyisocyanate compound (C) has a blocked isocyanate group represented by the following general formula (I):

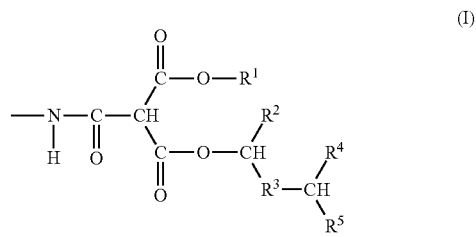

(wherein, $R^1$, $R^2$, $R^4$ and $R^5$ independently represent a hydrocarbon group having 1 to 12 carbon atoms and $R^3$ represents a linear or branched alkylene group having 1 to 12 carbon atoms), or a blocked isocyanate group represented by the following general formula (II):

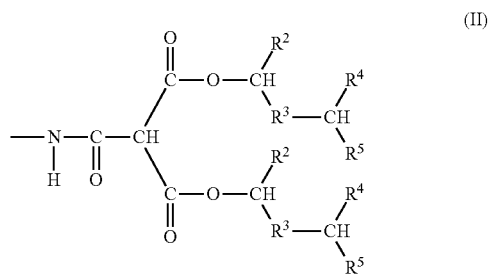

(wherein, $R^2$, $R^3$, $R^4$ and $R^5$ are the same as previously defined).

There are no particular limitations on the reaction between the blocked polyisocyanate compound (c3-1) and the secondary alcohol (c4) provided the procedure allows at least one $R^4$ in the blocked isocyanate group in the blocked polyisocyanate compound (c3-1) to be substituted with a group represented by general formula (VII). In particular, a preferable method consists of obtaining the blocked polyisocyanate compound (C) having a blocked isocyanate group represented by general formula (I) or (II) by distilling off all or a portion of alcohol derived from at least one of $R^1$ in the blocked polyisocyanate compound (c3-1) outside the system by heating or reducing pressure to accelerate the reaction.

More specifically, in the aforementioned production method, all or a portion of the aforementioned alcohol is suitably removed over the course of 5 minutes to 20 hours and preferably 10 minutes to 10 hours at a temperature of 20° C. to 150° C. and preferably 75° C. to 95° C. while reducing pressure as desired. If the aforementioned temperature is excessively low, the alkoxy group exchange reaction in the blocked polyisocyanate compound (c3-1) slows resulting in a decrease in production efficiency, while if the aforementioned temperature is excessively high, decomposition and degradation of the resulting blocked polyisocyanate compound (C) become intense resulting in a decrease in curability.

In addition, the blocked polyisocyanate compound (C) can be obtained by reacting the blocked polyisocyanate compound (c3), described in the explanation of the blocked polyisocyanate compound (c3) and represented by the following general formula (V):

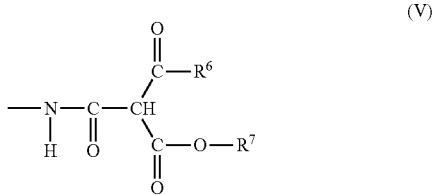

(wherein, $R^6$ and R7 independently represent a hydrocarbon group having 1 to 12 carbon atoms), with the secondary alcohol (c4).

In this case, $R^7$ in the blocked isocyanate group in the aforementioned blocked polyisocyanate compound (c3-2) is substituted with a group represented by the following general formula (VII):

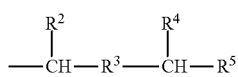

(wherein, $R^2$, $R^4$ and $R^5$ independently represent a hydrocarbon group having 1 to 12 carbon atoms and $R^3$ represents a linear or branched alkylene group having 1 to 12 carbon atoms).

In this case, the resulting blocked polyisocyanate compound (C) has a blocked isocyanate group represented by the following general formula (III):

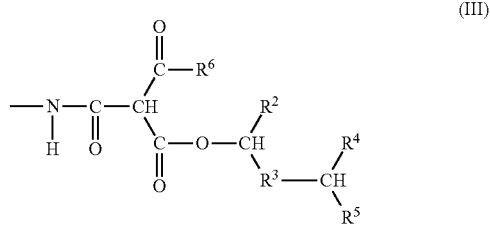

(wherein, $R^2$, $R^3$, $R^4$ and $R^5$ are the same as previously defined and $R^6$ represents a hydrocarbon group having 1 to 12 carbon atoms).

There are no particular limitations on the reaction between the blocked polyisocyanate compound (c3-2) and the secondary alcohol (c4) provided the procedure allows $R^7$ in the blocked isocyanate group in the blocked polyisocyanate compound (c3-2) to be substituted with a group represented by general formula (VII). In particular, a preferable method consists of obtaining the blocked polyisocyanate compound (C) having a blocked isocyanate group represented by general formula (III) by distilling off all or a portion of alcohol derived from $R^7$ in the blocked polyisocyanate compound (c3-2) outside the system by heating or reducing pressure to accelerate the reaction.

More specifically, in the aforementioned production method, all or a portion of the aforementioned alcohol is suitably removed over the course of 5 minutes to 20 hours and preferably 10 minutes to 10 hours at a temperature of 20° C. to 150° C. and preferably 75° C. to 95° C. while reducing pressure as desired. If the aforementioned temperature is excessively low, the alkoxy group exchange reaction in the blocked polyisocyanate compound (c3-2) slows resulting in a decrease in production efficiency, while if the aforementioned temperature is excessively high, decomposition and degradation of the resulting blocked polyisocyanate compound (C) become intense resulting in a decrease in curability.

In addition, the blending ratio between the block polyisocyanate compound (c3) and the secondary alcohol (c4) when producing the blocked polyisocyanate compound (C) is such that the amount of the secondary alcohol (c4) is preferably within the range of 5 parts by weight to 300 parts by weight and more preferably within the range of 10 parts by weight to 200 parts by weight based on 100 parts by weight of the solid content weight of the blocked polyisocyanate compound (c3). If the blended amount of the secondary alcohol (c4) is less than 5 parts by weight, the reaction rate between the blocked polyisocyanate compound (c3) and the secondary alcohol (c4) may be excessively slow. In addition, if the blended amount exceeds 500 parts by weight, the concentration of the blocked polyisocyanate compound (C) formed is excessively low and production efficiency may decrease.

In addition, in the aforementioned reaction between the blocked polyisocyanate compound (c3) and the secondary alcohol (c4), the aforementioned removal procedure may be carried out after adding a polyol compound to the blocked polyisocyanate compound (c3) and the secondary alcohol (c4) in order to adjust the molecular weight of the blocked polyisocyanate compound (C).

The number average molecular weight of the blocked polyisocyanate compound (C) used in the present invention is preferably within the range of 600 to 30,000 from the viewpoints of compatibility with other coating components and finish quality, adhesiveness and moisture resistance of the coating film formed. The upper limit of the aforementioned number average molecular weight is more preferably 10,000 and even more preferably 5,000. In addition, the lower limit thereof is more preferably 900 and even more preferably 1,000 from the viewpoint of adhesiveness and moisture resistance of the coating film formed.

In addition, the aforementioned blocked polyisocyanate compound (C) may be preliminarily mixed with a surfactant. In this case, the surfactant is preferably a nonionic surfactant and/or anionic surfactant from the viewpoint of the stability of the aqueous coating composition containing the blocked polyisocyanate compound (C).

In the case the blocked polyisocyanate compound (C) has a hydrophilic group, the storage stability thereof is superior particularly when storing in water. The reason for this is that the blocked polyisocyanate compound (C) is comparatively stable in water due to the hydrophilic group, and as a result of having a hydrocarbon group having a branched structure, the polarity of the blocked isocyanate group decreases, which is presumed to result in less susceptibility to hydrolysis.

In the present invention, the content ratio of the aforementioned blocked polyisocyanate compound (C) is preferably within the range of 10% by weight to 40% by weight and more preferably within the range of 10% by weight to 35% by weight based on the total solid content weight of the aqueous dispersion of the modified polyolefin (A), the aqueous acrylic resin (B) and the blocked polyisocyanate compound (C) from the viewpoints of finish quality, adhesiveness and moisture resistance of the coating film formed.

[Aqueous Coating Composition]

The aqueous coating composition of the present invention can be prepared by, for example, mixing the aqueous dispersion of the modified polyolefin (A), the aqueous acrylic resin (B) and the blocked polyisocyanate compound (C) in accordance with ordinary methods, and suitably diluting with an aqueous medium such as deionized water.

The aqueous coating composition of the present invention can contain a resin component other than the aqueous dispersion of the modified polyolefin (A), the aqueous acrylic resin (B) and the blocked polyisocyanate compound (C) as desired. Examples of the aforementioned resin component include an aqueous polyurethane resin, aqueous polyester resin and crosslinking agents such as an amino resin, (blocked) polyisocyanate other than the blocked polyisocyanate compound (C) or epoxy resin.

The aforementioned aqueous polyurethane resin is a water-soluble or water-dispersible resin having urethane bonds in a molecule thereof, and examples of forms thereof include a self-emulsifying emulsion having an acid value, an emulsion that combines the use of an emulsifier, and a water-soluble resin, with the form of an emulsion being particularly preferable. Urethane emulsions are normally obtained by forced emulsification or self-emulsification of a urethane prepolymer, which is obtained by preliminarily reacting a diol, a diisocyanate, and as desired, a dimethylolalkanoic acid, in the presence of an emulsifier while dispersing in water.

Examples of the backbone of the aforementioned aqueous polyurethane resin include ether-based, carbonate-based and ester-based backbones, and among these, an ether-based or carbonate-based backbone is preferable from the viewpoint of moisture resistance of the coating film formed. In addition, the aqueous polyurethane resin preferably contains a hydroxyl group.

In the case of using the aforementioned aqueous polyurethane resin, normally the amount used thereof is preferably within the range of 1 part by weight to 40 parts by weight and particularly preferably within the range of 5 parts by weight to 35 parts by weight based on 100 parts by weight of the total solid content weight of the aqueous dispersion of the modified polyolefin (A), the aqueous acrylic resin (B) and the blocked polyisocyanate compound (C) in the aqueous coating composition from the viewpoints of finish quality and cleanability.

The aforementioned aqueous polyester resin includes that obtained by esterifying a polyvalent alcohol, polybasic acid, and as desired, a monobasic acid or oil component (including fatty acids) and the like, followed by neutralizing the resulting oil-free or oil-modified polyester resin.

Examples of the aforementioned polyvalent alcohol include ethylene glycol, diethylene glycol, propylene glycol, butanediol, pentanediol, hexanediol, 2,2-dimethylpropanediol, glycerin, trimethylolpropane, pentaerythritol, and ethylene oxide adducts and propylene oxide adducts of bisphenol compounds, and one type or two or more types thereof can be used.

Examples of the aforementioned polybasic acid include phthalic acid, isophthalic acid, tetrahydrophthalic acid, hexahydrophthalic acid, maleic acid, succinic acid, adipic acid, sebacic acid, trimellitic acid, pyromellitic acid and anhydrides thereof, and one type or two or more types thereof can be used.

In addition, examples of the aforementioned monobasic acid include benzoic acid and tert-butylbenzoic acid. Examples of the aforementioned oil component include castor oil, dehydrated castor oil, safflower oil, soybean oil, linseed oil, tall oil, coconut oil and fatty acids thereof, and one type or two or more types thereof can be used.

The aforementioned aqueous polyester resin can have a carboxyl group by using in combination with a polybasic acid such as trimellitic acid or pyromellitic acid having 3 or more carboxyl groups in a molecule thereof or by half-ester addition of a dicarboxylic acid, or can have a hydroxyl group by using in combination with a polyvalent alcohol such as glycerin or trimethylolpropane having 3 or more hydroxyl groups in a molecule thereof.

Carboxyl groups of the aforementioned aqueous polyester resin can be neutralized using the previously described basic substances as desired.

The aforementioned aqueous polyester resin preferably contains a hydroxyl group, typically has a hydroxyl value preferably within the range of 20 mgKOH/g to 200 mgKOH/g and particularly preferably within the range of 20 mgKOH/g to 150 mgKOH/g, and typically has an acid value preferably within the range of 1 mgKOH/g to 100 mgKOH/g and particularly preferably within the range of 10 mgKOH/g to 70 mgKOH/g from the viewpoints of dispersibility in water, compatibility with other components and curability of the coating film formed.

In the case of using the aforementioned aqueous polyester resin, the amount used thereof is normally within the range of 1 part by weight to 30 parts by weight, and particularly preferably within the range of 5 parts by weight to 25 parts by weight, based on 100 parts by weight of the total solid content weight of the aqueous dispersion of the modified polyolefin (A), the aqueous acrylic resin (B) and the blocked polyisocyanate compound (C) in the aqueous coating composition from the viewpoints of moisture resistance and coating storageability.

An example of the aforementioned amino resin is a known melamine resin.

In the case of using an amino resin such as melamine resin, the amount used thereof is normally within the range of 1 part by weight to 30 parts by weight and particularly suitably within the range of 5 parts by weight to 20 parts by weight based on 100 parts by weight of the total solid content weight of the aqueous dispersion of the modified polyolefin (A), the aqueous acrylic resin (B) and the blocked polyisocyanate compound (C) in the aqueous coating composition.

The aqueous coating composition of the present invention can contain an electrically conductive pigment for the purpose of imparting electrical conductivity to a plastic base material. There are no particular limitations on the aforementioned electrically conductive pigment provided it is able to impart electrical conductivity to the coating film formed, and examples of the form of the pigment include granules, flakes and fibers (including whiskers). More specifically, examples of the aforementioned electrically conductive pigment include electrically conductive carbon such as electrically conductive carbon black, carbon nanotubes, carbon nanofibers or carbon microcoils, metal powders such as silver, nickel, copper, graphite or aluminum powder, coated pigments such as antimony-doped tin oxide, phosphorous-doped tin oxide, tin oxide/antimony-coated acicular titanium oxide, antimony oxide, zinc antimonate, indium tin oxide or tin oxide-coated carbon or graphite whiskers, pigment coated with at least one type of electrically conductive metal oxide selected from the group consisting of indium-doped tin oxide (ITO), fluorine-doped tin oxide (FTO), phosphorous-doped tin oxide and nickel oxide, and electrically conductive pigments containing tin oxide or phosphorous on the surface of titanium dioxide particles, and each of these can be used alone or two or more types can be used in combination. The aforementioned electrically conductive pigment is preferably electrically conductive carbon.

Normally the content of the aforementioned electrically conductive pigment is preferably within the range of 1 part by weight to 300 parts by weight, particularly preferably within the range of 2 parts by weight to 250 parts by weight and more preferably within the range of 3 parts by weight to 180 parts by weight based on 100 parts by weight of the total solid content weight of the aqueous dispersion of the modified polyolefin (A), the aqueous acrylic resin (B) and the blocked polyisocyanate compound (C) in the aqueous coating composition from the viewpoints of electrical conductivity and adhesiveness and moisture resistance of the coating film formed. In the case of using electrically conductive carbon in particular, normally the amount used thereof is preferably within the range of 1 part by weight to 30 parts by weight and more preferably within the range of 3 parts by weight to 25 parts by weight based on 100 parts by weight of the total solid content weight of the aqueous dispersion of the modified polyolefin (A), the aqueous acrylic resin (B) and the blocked polyisocyanate compound (C) in the aqueous coating composition.

The aqueous coating composition of the present invention can contain, as desired, pigment other than the aforementioned electrically conductive pigment, examples of which include coloring pigments such as titanium oxide, red iron oxide, aluminum paste, azo-based pigments and phthalocyanine-based pigments, and extenders such as talc, silica, calcium carbonate, barium sulfate or zinc flower (zinc oxide), and each of these can be used alone or two or more types can be used in combination.

The aqueous coating composition of the present invention can contain, as desired, a coating additive such as a curing catalyst, thickener, antifoaming agent, organic solvent or surface modifier.

As was previously described, the aqueous coating composition of the present invention can be coated on the surface of a plastic base material. Although a polyolefin formed by (co)polymerizing one type of two or more types of olefins having 2 to 10 carbon atoms in the manner of ethylene, propylene, butylene or hexylene and the like is particularly preferable for the aforementioned plastic base material, other materials such as polycarbonate, ABS plastic, urethane resin or polyamide can also apply the aqueous coating composition of the present invention. Examples of molded articles made of the aforementioned materials include automobile external panels such as bumpers, spoilers, grills or fenders and plastic molded articles used in the outer casings of electrical home appliances.

The surfaces of these plastic base materials can be suitably subjected to degreasing treatment or rinsing treatment and the like using known methods prior to coating with the aqueous coating composition of the present invention.

The aqueous coating composition of the present invention is preferably applied to the surface of a plastic base material at a dry film thickness normally within the range of 1 μm to 20 μm and preferably within the range of 3 μm to 11 μm using air spraying, airless spraying, dipping or brush coating. After having applied the aforementioned aqueous coating composition, the resulting coating film can be allowed to set for about 30 seconds to 60 minutes at room temperature, can be preheated for 1 minute to 60 minutes at a temperature of about 40° C. to about 80° C., or can be cured by heating for about 20 minutes to 40 minutes at a temperature of about 60° C. to about 140° C. and preferably about 70° C. to about 120° C.

In the present invention, however, the aforementioned aqueous coating composition can be subjected to top-coating in a subsequent step without preheating after coating, and is preferably allowed to set for about 30 seconds to 5 minutes at room temperature (about 20° C. to about 35° C.) following application of the aqueous coating composition of the present invention. As a result, the solid content concentration of the coated coating material can be rapidly increased following application of the aqueous coating composition of the present invention (such as being able to increase the solid content concentration of the coated coating material 1 minute after application to preferably 45% by weight or more and more preferably 50% by weight or more), thereby making it possible to prevent layer mixing with the upper layer coating film without preheating.

Furthermore, the solid content concentration of the coated coating material, such as the solid content concentration of the coated coating material 1 minute after application, can be determined in the manner indicated below. First, a coating material is applied over a fixed area of aluminum foil under the same conditions as described above, the aluminum foil is recovered 1 minute later, and the aluminum foil is weighed immediately so as to promptly determine the weight to prevent any further evaporation of water or other solvent. Subsequently, the aluminum foil is opened up and the weight after curing is determined under the same conditions as the heat-curing conditions of a multilayer coating film. The solid content concentration of the coated coating material is then calculated from these weights and the preliminarily determined weight of the aluminum foil per se.

The primer coating film formed from the aforementioned aqueous coating composition is able to have electrical conductivity, and typically the surface resistivity of the primer coating film (cured coating film) is preferably $1 \times 10^8$ Ω/or less and particularly preferably $1 \times 10^7$ Ω/or less. As a result, the electrically conductive primer coating film makes it possible to realize favorable electrostatic coating in the next step. Furthermore, measurement of "surface resistivity" as referred to here can be carried out by drying a coating film for 10 minutes at 80° C. to a dry film thickness of about 15 μm, and then measuring surface resistivity using the TREK Model 150 Surface Ohmmeter (trade name, TREK, Inc.) (units: Ω/).

A primer coating film formed from the aqueous coating composition of the present invention can subsequently be electrostatically coated with a top-coat. A colored coating material may be used alone for the aforementioned top-coat, or the colored coating material may be used as a base coating material followed by successive application of a base coating material and clear coating material. In addition, a colored base coating film layer may be formed in the form of a multilayer film by sequentially applying a white base coating material and an interference pearl-colored base coating material.

A known colored coating material can be used for the aforementioned colored coating material, an organic solvent and/or water can normally be used for the primary solvent, and the colored coating material can contain a coloring component such as a coloring pigment, luster pigment or dye, a base resin and a crosslinking agent and the like.

Examples of the base resin used in the aforementioned colored coating material include resins such as acrylic resin, polyester resin or alkyd resin having a reactive functional group such as a hydroxyl group, epoxy group, carboxyl group or silanol group. In addition, examples of the aforementioned crosslinking agent include amino resins such as melamine resin or urea resin, (blocked) polyisocyanates, polyepoxides and polycarboxylic acids having a reactive functional group capable of reacting with the aforementioned functional group.

The aforementioned colored coating material can contain, as desired, a coating additive such as an extender, curing solvent, ultraviolet absorber, surface modifier, rheology control agent, antistatic agent, antifoaming agent, wax or preservative.

The aforementioned colored coating material is electrostatically coated onto the aforementioned uncured or cured primer coating film to a dry film thickness normally within the range of 5 μm to 50 μm, preferably within the range of 5 μm to 30 μm, and more preferably within the range of 10 μm to 20 μm, and the resulting coating film surface can be allowed to set for about 1 minute to 60 minutes at room temperature as desired, can be preheated for about 1 minute to 60 minutes at a temperature of about 40° C. to about 80° C., or can be cured by heating for about 20 minutes to 40 minutes at a temperature of about 60° C. to about 140° C. and preferably about 80° C. to about 120° C. In the present invention, clear coating is preferably carried out after applying the colored base coating material without curing.

The aforementioned clear coating material contains, for example, a resin component such as a base resin or crosslinking agent, an organic solvent and water, and is an organic solvent-based or aqueous heat-curable coating material containing a coating material additive such as an ultraviolet absorber, photostabilizer, curing catalyst, surface modifier, rheology control agent, antioxidant, antifoaming agent or wax as desired, and a clear coating material can be used that has transparency of a degree that allows a lower layer coating film to be visible through the clear coating film formed.

Examples of the aforementioned base resin include resins such as acrylic resin, polyester resin, alkyd resin, fluorine resin, urethane resin or silicon-containing resin containing at least one type of reactive functional group such as a hydroxyl group, carboxyl group, silanol group or epoxy group, and a hydroxyl group-containing acrylic resin is particularly preferable. Examples of the aforementioned crosslinking agent include melamine resin, urea resin, (blocked) polyisocyanate compounds, epoxy compounds, carboxyl group-containing compounds, acid anhydrides and alkoxysilane group-containing compounds having a reactive functional group capable of reacting with these functional groups, and a polyisocyanate compound is particularly preferable.

The aforementioned clear coating material can be applied by electrostatically coating onto an uncured or cured colored base coating film to a dry film thickness normally within the range of 10 μm to 50 μm and preferably within the range of 20 μm to 40 μm, and the resulting coating film surface can be allowed to set for about 1 minute to 60 minutes at room temperature as desired, can be preheated for about 1 minute to 60 minutes at a temperature of about 40° C. to about 80° C., or can be cured by heating for about 20 minutes to 40 minutes at a temperature of about 60° C. to about 140° C. and preferably about 70° C. to about 120° C.

In this manner, a plastic molded article can be obtained in which a colored base coating film and a clear coating film are coated onto a primer coating film.

EXAMPLES

The following provides a more detailed explanation of the present invention by listing examples thereof. Furthermore, the terms "parts" and "percent (%)" refers to "parts by weight" and "percent (%) by weight" unless specifically indicated otherwise.

[Production of Blocked Polyisocyanate Compound (C)]

Production Example 1

480 parts of "Sumidur N-3300" (trade name, Sumitomo Bayer Urethane Co., Ltd., polyisocyanate containing isocyanurate structure derived from hexamethylene diisocyanurate, solid content concentration: approximately 100%, isocyanate group content ratio: 21.8%), 150 parts of ethyl acetate and 365 parts of diisopropyl malonate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.07 mol/kg.

870 parts of 4-methyl-2-pentanol were added to the reaction vessel followed by distilling off the solvent over the course of 3 hours under reduced pressure conditions while holding the temperature of the reaction vessel at 90° C. to 95° C., and further adding 120 parts of 4-methyl-2-pentanol to the reaction vessel to obtain 1400 parts of a solution of blocked polyisocyanate compound (C-1). The simple solvent removal trap contained 183 parts of isopropanol. The solid content concentration of the resulting solution of blocked polyisocyanate compound (C-1) was about 60%.

Production Example 2

480 parts of "Sumidur N-3300", 150 parts of ethyl acetate, 330 parts of diisopropyl malonate and 27 parts of isopropyl acetoacetate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.08 mol/kg.

870 parts of 4-methyl-2-pentanol were added to the reaction vessel followed by distilling off the solvent over the course of 3 hours under reduced pressure conditions while holding the temperature of the reaction vessel at 90° C. to 95° C., and further adding 120 parts of 4-methyl-2-pentanol to the reaction vessel to obtain 1390 parts of a solution of blocked polyisocyanate compound (C-2). The simple solvent removal trap contained 173 parts of isopropanol. The solid content concentration of the resulting solution of blocked polyisocyanate compound (C-2) was about 60%.

Production Example 3

480 parts of "Sumidur N-3300", 150 parts of ethyl acetate, 280 parts of diethyl malonate and 30 parts of ethyl isobutyrylacetate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.08 mol/kg.

870 parts of 4-methyl-2-pentanol were added to the reaction vessel followed by distilling off the solvent over the course of 3 hours under reduced pressure conditions while holding the temperature of the reaction vessel at 90° C. to 95° C., and further adding 120 parts of 4-methyl-2-pentanol to the reaction vessel to obtain 1350 parts of a solution of blocked polyisocyanate compound (C-3). The simple solvent removal trap contained 133 parts of ethanol. The solid content concentration of the resulting solution of blocked polyisocyanate compound (C-3) was about 60%.

Production Example 4

480 parts of "Sumidur N-3300", 150 parts of ethyl acetate and 360 parts of diisopropyl malonate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.07 mol/kg.

990 parts of 5-methyl-2-hexanol were added to the reaction vessel followed by distilling off the solvent over the course of 3 hours under reduced pressure conditions while holding the temperature of the reaction vessel at 90° C. to 95° C., and further adding 120 parts of 5-methyl-2-hexanol to the reaction vessel to obtain 1400 parts of a solution of blocked polyisocyanate compound (C-4). The simple solvent removal trap contained 180 parts of isopropanol. The solid content concentration of the resulting solution of blocked polyisocyanate compound (C-4) was about 60%.

Production Example 5

450 parts of "Duranate TPA-100" (trade name, Asahi Kasei Chemicals Co., Ltd., polyisocyanate containing isocyanurate structure derived from hexamethylene diisocyanurate, solid content concentration: approximately 100%, isocyanate group content ratio: 23.1%), 150 parts of ethyl acetate and 360 parts of diisopropyl malonate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.07 mol/kg.

1110 parts of 6-methyl-2-heptanol were added to the reaction vessel followed by distilling off the solvent over the course of 6 hours under reduced pressure conditions while holding the temperature of the reaction vessel at 80° C. to 85° C., and further adding 120 parts of 6-methyl-2-heptanol to the reaction vessel to obtain 1430 parts of a solution of blocked polyisocyanate compound (C-5). The simple solvent removal trap contained 170 parts of isopropanol. The solid content concentration of the resulting solution of blocked polyisocyanate compound (C-5) was about 60%.

Production Example 6

480 parts of "Sumidur N-3300", 150 parts of ethyl acetate and 310 parts of diethyl malonate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.06 mol/kg.

630 parts of n-butanol were added to the reaction vessel followed by distilling off the solvent over the course of 3 hours under reduced pressure conditions while holding the temperature of the reaction vessel at 90° C. to 95° C., and further adding 90 parts of n-butanol to the reaction vessel to obtain 1270 parts of a solution of blocked polyisocyanate compound (C-6). The simple solvent removal trap contained 100 parts of ethanol. The solid content concentration of the resulting solution of blocked polyisocyanate compound (C-6) was about 60%.

Production Example 7

480 parts of "Sumidur N-3300", 150 parts of ethyl acetate and 310 parts of diethyl malonate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.06 mol/kg.

1110 parts of 2-ethylhexanol were added to the reaction vessel followed by distilling off the solvent over the course of 6 hours under reduced pressure conditions while holding the temperature of the reaction vessel at 80° C. to 85° C., and further adding 120 parts of 2-ethylhexanol to the reaction vessel to obtain 1410 parts of a solution of blocked polyisocyanate compound (C-7). The simple solvent removal trap contained 130 parts of ethanol. The solid content concentration of the resulting solution of blocked polyisocyanate compound (C-7) was about 60%.

Production Example 8

480 parts of "Sumidur N-3300", 150 parts of ethyl acetate and 310 parts of diethyl malonate were charged into a reaction vessel equipped with a thermometer, thermostat, stirring device, reflux condenser, nitrogen inlet tube, dropping device and simple solvent removal trap, followed by adding 4 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.06 mol/kg.

1000 parts of propylene glycol monopropyl ether were added to the reaction vessel followed by distilling off the solvent over the course of 3 hours under reduced pressure conditions while holding the temperature of the reaction vessel at 90° C. to 95° C., and further adding 120 parts of propylene glycol monopropyl ether to the reaction vessel to obtain 1380 parts of a solution of blocked polyisocyanate compound (C-8). The simple solvent removal trap contained 125 parts of ethanol. The solid content concentration of the resulting solution of blocked polyisocyanate compound (C-8) was about 60%.

Production Example 9

360 parts of "Sumidur N-3300", 60 parts of "Uniox M-550" (NOF Corp., polyethylene glycol monomethyl ether, average molecular weight: approximately 550) and 0.2 parts of 2,6-di-tert-butyl-4-methylphenol were charged into a reaction vessel equipped with a thermometer, thermostat, stirring device, reflux condenser, nitrogen inlet tube, dropping device and simple solvent removal trap, followed by heating for 3 hours at 130° C. in the presence of flowing nitrogen while stirring. Next, 110 parts of ethyl acetate and 252 parts of diisopropyl malonate were added to the reaction vessel followed by adding 3 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.12 mol/kg.

683 parts of 4-methyl-2-pentanol were added to the reaction vessel followed by distilling off the solvent over the course of 3 hours under reduced pressure conditions while holding the temperature of the reaction vessel at 80° C. to 85° C. to obtain 1010 parts of a solution of blocked polyisocyanate compound (C-9). The simple solvent removal trap contained 95 parts of isopropanol. The solid content concentration of the resulting solution of blocked polyisocyanate compound (C-9) was about 60%.

Production Example 10

360 parts of "Sumidur N-3300", 50 parts of "Uniox M-400" (NOF Corp., polyethylene glycol monomethyl ether, average molecular weight: approximately 400), 5 parts of "PEG #600" (NOF Corp., polyethylene glycol, average molecular weight: approximately 600) and 0.2 parts of 2,6-di-tert-butyl-4-methylphenol were charged into a reaction vessel equipped with a thermometer, thermostat, stirring device, reflux condenser, nitrogen inlet tube, dropping device and simple solvent removal trap, followed by heating for 3 hours at 130° C. in the presence of flowing nitrogen while stirring. Next, 110 parts of ethyl acetate and 247 parts of diisopropyl malonate were added to the reaction vessel followed by adding 3 parts of a 28% methanol solution of sodium methoxide to the reaction vessel while stirring the contents in the presence of flowing nitrogen, and further stirring the contents for 8 hours at 65° C. The amount of isocyanate in the resulting resin solution was 0.11 mol/kg.

670 parts of 4-methyl-2-pentanol were added to the reaction vessel followed by distilling off the solvent over the course of 3 hours under reduced pressure conditions while holding the temperature of the reaction vessel at 80° C. to 85° C. to obtain 1010 parts of a solution of blocked polyisocyanate compound (C-10). The simple solvent removal trap contained 92 parts of isopropanol. The solid content concentration of the resulting solution of blocked polyisocyanate compound (C-10) was about 60%.

[Production of Aqueous Primer]

Example 1

30 parts as the solid content weight of an aqueous dispersion of a modified polyolefin (A-1) (*1), 15 parts as the solid content weight of an aqueous acrylic resin (B-1) (*4), 20 parts as the solid content weight of an aqueous acrylic resin (B-2) (*5), 5 parts as the solid content weight of an aqueous polyurethane resin (*6), 5 parts as the solid content weight of an aqueous polyester resin (*7), 10 parts as the solid content weight of a melamine resin (*8), 15 parts as the solid content weight of a blocked polyisocyanate (C-1) and 80 parts as the solid content weight of an electrically conductive pigment (D-1) (*9) were blended in accordance with ordinary methods followed by diluting with deionized water to a solid content concentration of 40% to obtain an aqueous primer (1).

Examples 2-24 and Comparative Examples 1-5

Aqueous primers (2) to (29) were obtained by using the same procedure as Example 1 with the exception of changing the compositions as shown in Table 1.

The formulations of Table 1 are indicated in solid content weights, and notes (*1) to (*12) in Table 1 are as indicated below.

(*1) Aqueous Dispersion of Modified Polyolefin (A-1):

A modified polyolefin, obtained by modifying an ethylene-propylene copolymer (ethylene content: 5%), obtained using a metallocene catalyst, with 8% by weight of maleic acid adduct, and having a melting point of 80° C., Mw of about 100,000 and Mn of about 2.1, neutralized to equivalence with dimethylethanolamine, and water-emulsified using 10 parts of emulsifier to 100 parts of polypropylene/ethylene copolymer.

Furthermore, Mw and Mn refer to weight average molecular weight and number average molecular weight, respectively.

(*2) Aqueous Dispersion of Modified Polyolefin (A-2):

"Hardlen NA-3002", non-chlorinated polyolefin aqueous dispersion, trade name, Toyo Kasei Kogyo Co., Ltd., solid content concentration: 30%.

(*3) Aqueous Dispersion of Modified Polyolefin (A-3):

"EH-801", chlorinated polyolefin aqueous dispersion, trade name, Toyo Kasei Kogyo Co., Ltd., degree of chlorination: 16%, solid content concentration: 30%.

(*4) Aqueous Acrylic Resin (B-1):

"Bayhydrol XP2427", hydroxyl group-containing acrylic resin emulsion, trade name, Sumitomo Bayer Urethane Co., Ltd.

(*5) Aqueous Acrylic Resin (B-2):

An acrylic resin solution was used that was produced in the manner described below.

35 parts of propylene glycol monomethyl ether and 25 parts of propylene glycol monobutyl ether were charged into a reaction vessel equipped with a thermometer, thermostat, stirrer, reflux condenser and dropping device followed by stirring while heating the content and holding at 110° C. A mixture consisting of 15 parts of "NF Bisomer S20W" (trade name, Dai-ichi Kogyo Seiyaku Co., Ltd., methoxy polyethylene glycol monomethacrylate), 10 parts of 2-hydroxyethyl acrylate, 30 parts of methyl methacrylate, 15 parts of n-butyl acrylate, 5 parts of styrene, 20 parts of isobornyl acrylate, 5 parts of acrylic acid, 1 part of azobisisobutyronitrile and 20 parts of propylene glycol monomethyl ether was dropped in over the course of 3 hours.

Following completion of the reaction, the contents were aged for 30 minutes at 110° C. followed by dropping in an additional catalyst mixture consisting of 15 parts of propylene glycol monomethyl ether and 0.5 parts of azobisisobutyronitrile into the reaction vessel over the course of 1 hour. Next, after aging the contents for 1 hour at 110° C., the contents were cooled to obtain a solution of an acrylic resin (B-2) having a solid content concentration of 50%.

(*6) Aqueous Acrylic Resin:

"Ucoat UX-310", trade name, Sanyo Chemical Industries, Ltd., aqueous urethane emulsion.

(*7) Aqueous Polyester Resin:

A polyester resin solution was used that was produced in the manner described below.

105 parts of neopentyl glycol, 273 parts of trimethylolpropane, 320 parts of butyl ethyl propanediol, 219 parts of adipic acid and 385 parts of isophthalic acid were charged into a reaction vessel equipped with a thermometer, thermostat, stirring device, reflux condenser and water separator, followed by raising the temperature of the reaction vessel from 160° C. to 220° C. over the course of 3 hours and condensing the contents for 4 hours at 220° C. while distilling off the condensed water that formed with the water separator.

Next, in order to add a carboxyl group to the resulting condensation reaction product, 76 parts of trimellitic acid anhydride were further added to the reaction vessel and allowed to react for 30 minutes at 170° C. followed by adding 5.5 parts of dimethylethanolamine and 120 parts of deionized water to the reaction vessel while stirring to obtain a solution of a hydroxyl group-containing polyester resin having a solid content concentration of 70%. The resulting hydroxyl group-containing polyester resin had an acid value of 3.5 mgKOH/g, hydroxyl value of 140 mgKOH/g and number average molecular weight of 5,000.

(*8) Melamine Resin:
"Cymel 325", trade name, Japan Cytec Industries Ltd.

(*9) Electrically Conductive Pigment (D-1):
"Vulcan XC72", trade name, Cabot Specialty Chemicals Inc., electrically conductive carbon black pigment.

(*10) Electrically Conductive Pigment (D-2):
"Ketjen EC300J", trade name, Ketjen Black International Co., electrically conductive carbon black pigment.

(*11) Electrically Conductive Pigment (D-3):
"ET-500W", trade name, Ishihara Sangyo Kaisha Ltd., electrically conductive titanium oxide.

(*12) Titanium White:
"JR-806", trade name, Tayca Corp.

Aqueous primers (1) to (27) were stored for 10 days at 40° C. followed by visually observing their status in the containers and evaluating storage stability based on the criteria indicated below.

G: Remained in original state without changing
F: Slight thickening
P: At least one of pigment settling, solid formation and remarkable thickening The results of evaluating storage stability are also shown in Table 1.

TABLE 1

| | | | | | | | | | Examples | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Aqueous primer | | (1) | (2) | (3) | (4) | (5) | (6) | (7) | (8) | (9) | (10) | (11) | (12) | (13) | (14) | (15) |
| Modified polyolefin aqueous Dispersion | A-1(*1) | 30 | 30 | 30 | 30 | 30 | 30 | 30 | 30 | — | — | — | — | 30 | 30 | 30 |
| | A-2(*2) | — | — | — | — | — | — | — | — | 30 | — | 30 | — | — | — | — |
| | A-3(*3) | — | — | — | — | — | — | — | — | — | 30 | — | 30 | — | — | — |
| Aqueous acrylic resin | B-1(*4) | 15 | 15 | 15 | 15 | 15 | 15 | 15 | 15 | 15 | 15 | 15 | 15 | 15 | 15 | 15 |
| | B-2(*5) | 20 | 20 | 20 | 20 | 20 | 20 | 20 | 20 | 20 | 20 | 20 | 20 | 20 | 20 | 20 |
| Aqueous polyurethane resin (*6) | | 5 | 5 | 5 | 5 | 5 | 5 | 5 | 5 | 5 | 5 | 5 | 5 | 5 | 5 | — |
| Aqueous polyester resin (*7) | | 5 | 5 | 5 | 5 | 5 | 5 | 5 | 5 | 5 | 5 | 5 | 5 | 5 | 5 | 10 |
| Melamine resin (*8) | | 10 | 10 | 10 | 10 | 10 | 10 | 10 | 10 | 10 | 10 | 10 | 10 | 10 | 10 | 10 |
| Blocked polyisocyanate | C-1 | 15 | — | — | — | — | — | — | 5 | 15 | 15 | — | — | — | — | — |
| | C-2 | — | 15 | — | — | — | — | — | — | — | — | — | — | — | — | — |
| | C-3 | — | — | 15 | — | — | — | — | — | — | — | — | — | — | — | — |
| | C-4 | — | — | — | 15 | — | — | — | — | — | — | — | — | — | — | — |
| | C-5 | — | — | — | — | 15 | — | — | — | — | — | — | — | — | — | — |
| | C-6 | — | — | — | — | — | — | — | — | — | — | — | — | — | — | — |
| | C-7 | — | — | — | — | — | — | — | — | — | — | — | — | — | — | — |
| | C-8 | — | — | — | — | — | — | — | — | — | — | — | — | — | — | — |
| | C-9 | — | — | — | — | — | 15 | — | 10 | — | — | 15 | 15 | — | 15 | 15 |
| | C-10 | — | — | — | — | — | — | 15 | — | — | — | — | — | 15 | — | — |
| Electrically conductive pigment | D-1(*9) | 20 | 20 | 20 | 20 | 20 | 20 | 20 | 20 | 20 | 20 | 20 | 20 | — | — | 20 |
| | D-2(*10) | — | — | — | — | — | — | — | — | — | — | — | — | 20 | — | — |
| | D-3(*11) | — | — | — | — | — | — | — | — | — | — | — | — | — | 80 | — |
| Titanium white (*12) | | 80 | 80 | 80 | 80 | 80 | 80 | 80 | 80 | 80 | 80 | 80 | 80 | 80 | 80 | 80 |
| Coating solid content (%) | | 40 | 40 | 40 | 40 | 40 | 40 | 40 | 40 | 40 | 40 | 40 | 40 | 40 | 40 | 40 |
| Storage stability | | G | G | G | G | G | G | G | G | G | G | G | G | G | G | G |

| | | | | Examples | | | | | | | Comparative Examples | | | | |
|---|---|---|---|---|---|---|---|---|---|---|---|---|---|---|---|
| | | 16 | 17 | 18 | 19 | 20 | 21 | 22 | 23 | 24 | 1 | 2 | 3 | 4 | 5 |
| Aqueous primer | | (16) | (17) | (18) | (19) | (20) | (21) | (22) | (24) | (24) | (25) | (26) | (27) | (28) | (29) |
| Modified polyolefin aqueous Dispersion | A-1(*1) | 30 | 30 | 20 | 10 | 40 | 40 | 40 | — | — | 30 | 30 | 30 | 30 | 40 |
| | A-2(*2) | — | — | — | — | — | — | — | 40 | — | — | — | — | — | — |
| | A-3(*3) | — | — | — | — | — | — | — | — | 40 | — | — | — | — | — |
| Aqueous acrylic resin | B-1(*4) | 20 | 15 | 20 | 25 | 10 | 10 | 10 | 10 | 10 | 15 | 15 | 15 | 15 | 15 |
| | B-2(*5) | 20 | 20 | 20 | 20 | 15 | 15 | 15 | 15 | 15 | 20 | 20 | 20 | 20 | 15 |
| Aqueous polyurethane resin (*6) | | — | 5 | 5 | 5 | 20 | 20 | 20 | 20 | 20 | 5 | 5 | 5 | 5 | 30 |
| Aqueous polyester resin (*7) | | — | 5 | 10 | 15 | — | — | — | — | — | 5 | 5 | 5 | 5 | — |
| Melamine resin (*8) | | 10 | 5 | 10 | 10 | — | — | — | — | — | 10 | 10 | 10 | 25 | — |
| Blocked polyisocyanate | C-1 | — | — | — | — | 15 | — | — | — | — | — | — | — | — | — |
| | C-2 | — | — | — | — | — | — | — | — | — | — | — | — | — | — |
| | C-3 | — | — | — | — | — | — | — | — | — | — | — | — | — | — |
| | C-4 | — | — | — | — | — | — | — | — | — | — | — | — | — | — |

TABLE 1-continued

|  |  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
|  | C-5 | — | — | — | — | — | — | — | — | — | — | — | — | — | — |
|  | C-6 | — | — | — | — | — | — | — | — | — | 15 | — | — | — | — |
|  | C-7 | — | — | — | — | — | — | — | — | — | — | 15 | — | — | — |
|  | C-8 | — | — | — | — | — | — | — | — | — | — | — | 15 | — | — |
|  | C-9 | 20 | 20 | 15 | 15 | — | 15 | — | 15 | 15 | — | — | — | — | — |
|  | C-10 | — | — | — | — | — | — | 15 | — | — | — | — | — | — | — |
| Electrically conductive pigment | D-1(*9) | 20 | 20 | 20 | 20 | 20 | 20 | 20 | 20 | 20 | 20 | 20 | 20 | 20 | 20 |
|  | D-2(*10) | — | — | — | — | — | — | — | — | — | — | — | — | — | — |
|  | D-3(*11) | — | — | — | — | — | — | — | — | — | — | — | — | — | — |
| Titanium white (*12) |  | 80 | 80 | 80 | 80 | 80 | 80 | 80 | 80 | 80 | 80 | 80 | 80 | 80 | 80 |
| Coating solid content (%) |  | 40 | 40 | 40 | 40 | 40 | 40 | 40 | 40 | 40 | 40 | 40 | 40 | 40 | 40 |
| Storage stability |  | G | G | G | G | G | G | G | G | G | P | P | P | F | F |

[Fabrication of Test Coated Sheets (1)]

Black polypropylene sheets (degreased, to be abbreviated as "PP sheet") were spray-coated with any one of aqueous primers (1) to (19) and (25) to (28) to a dry film thickness of about 10 μm and allowed to stand for 3 minutes at room temperature followed by electrostatically coating with a colored base coat coating material in the form of "WBC710 Metallic Base" (trade name, Kansai Paint Co., Ltd., aqueous metallic base coat coating material) to a dry film thickness of about 15 μm, preheating the PP sheet for 5 minutes at 80° C., additionally electrostatically coating with a clear coating material in the form of "SFX7172 Clear" (trade name, Kansai Paint Co., Ltd., clear urethane-based solvent-type clear coating material) to a dry film thickness of about 30 μm, allowing the PP sheet to set for 10 minutes and finally drying the PP sheet by heating for 30 minutes at 120° C. to fabricate 23 types of test coated sheets (1).

[Fabrication of Test Coated Sheets (2)]

23 types of test coated sheets (2) were fabricated in the same manner as test coated sheets (1) with the exception of changing the baking temperature following coating with the clear coating material from 120° C. to 110° C.

[Fabrication of Test Coated Sheets (3)]

Black polypropylene sheets (degreased, to be abbreviated as "PP sheets") were spray-coated with any one of aqueous primers (20) to (24) and (29) to a dry film thickness of about 10 μm followed by allowing to stand for 5 minutes at room temperature, electrostatically coating with a colored base coat coating material in the form of "WB ECO Base" (trade name, Kansai Paint Co., Ltd., aqueous colored base coat coating material) to a dry film thickness of about 15 μm, preheating the PP sheet for 3 minutes at 80° C., additionally electrostatically coating with a clear coating material in the form of "SFX7500 Clear" (trade name, Kansai Paint Co., Ltd., acrylic urethane-based solvent-type clear coating material) to a dry film thickness of about 30 μm and drying the PP sheet by heating for 30 minutes at 80° C. to fabricate 6 types of test coated sheets (3).

[Performance Tests]

The following performance tests were carried out on the test coated sheets (1) to (3). The results for test coated sheets (1) and (2) are shown in Table 2, while the results for test coated sheets (3) are shown in Table 3.

(*1) Finish Quality

The finish quality of the test coated sheets was evaluated visually based on the criteria indicated below.

G: Favorable finished surface and gloss

F: Somewhat inferior finished surface or gloss

P: Inferior finished surface or gloss (*2) Initial Adhesiveness

Lines were cut into thee coating film surface of the test coated sheets using a cutter under conditions of 20° C. so as to extend to the substrate and form 100 squares having a size of 2 mm×2 mm, followed by adhering adhesive Cellophane Tape® to the surface thereof, rapidly pulling off, investigating the number of squares in which the coating film remained and evaluating based on the criteria indicated below.

G: 100 squares in which coating film remained (no peeling)

F: 50-99 squares in which coating film remained

P: 49 or fewer squares in which coating film remained (*3) Moisture Resistance (Adhesiveness)

The test coated sheets were immersed in 40° C. warm water for 10 days, lifted out and dried followed by carrying out a test in the same manner as the aforementioned initial adhesiveness test and evaluating in the same manner as described above.

(*4) Water Resistance (Blistering)

The test coated sheets were immersed in 40° warm water for 10 days, lifted out and dried followed by observing the surface of the coating film, investigating for the presence or absence of blistering and evaluating based on the criteria indicated below.

G: No blistering

P: Blistering

TABLE 2

|  |  | Examples |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Aqueous primer |  | (1) | (2) | (3) | (4) | (5) | (6) | (7) | (8) | (9) | (10) | (11) | (12) |
| Test coated sheets (1) | Finish quality | G | G | G | G | G | G | G | G | G | G | G | G |
|  | Initial adhesiveness | G | G | G | G | G | G | G | G | G | G | G | G |
|  | Moisture resistance (adhesiveness) | G | G | G | G | G | G | G | G | G | G | G | G |
|  | Moisture resistance (blistering) | G | G | G | G | G | G | G | G | G | G | G | G |
| Test coated sheets (2) | Finish quality | G | G | G | G | G | G | G | G | G | G | G | G |
|  | Initial adhesiveness | G | G | G | G | G | G | G | G | G | G | G | G |
|  | Moisture resistance (adhesiveness) | G | G | G | G | G | G | G | G | G | G | G | G |
|  | Moisture resistance (blistering) | G | G | G | G | G | G | G | G | G | G | G | G |

TABLE 2-continued

| | | Examples | | | | | | | Comparative Examples | | | |
|---|---|---|---|---|---|---|---|---|---|---|---|---|
| | | 13 | 14 | 15 | 16 | 17 | 18 | 19 | 1 | 2 | 3 | 4 |
| Aqueous primer | | (13) | (14) | (15) | (16) | (17) | (18) | (19) | (25) | (26) | (27) | (28) |
| Test | Finish quality | G | G | G | G | G | G | G | F | F | F | F |
| coated | Initial adhesiveness | G | G | G | G | G | G | G | G | G | G | G |
| sheets | Moisture resistance (adhesiveness) | G | G | G | G | G | G | G | G | G | G | G |
| (1) | Moisture resistance (blistering) | G | G | G | G | G | G | G | G | G | G | P |
| Test | Finish quality | G | G | G | G | G | G | G | F | F | F | F |
| coated | Initial adhesiveness | G | G | G | G | G | G | G | G | G | G | G |
| sheets | Moisture resistance (adhesiveness) | G | G | G | G | G | G | G | G | G | G | P |
| (2) | Moisture resistance (blistering) | G | G | G | G | G | G | G | G | G | G | P |

TABLE 3

| | | Examples | | | | | Comparative Example |
|---|---|---|---|---|---|---|---|
| | | 20 | 21 | 22 | 23 | 24 | 5 |
| Aqueous primer | | (20) | (21) | (22) | (23) | (24) | (29) |
| Test coated sheets (3) | Finish quality | G | G | G | G | G | F |
| | Initial adhesiveness | G | G | G | G | G | G |
| | Moisture resistance (adhesiveness) | G | G | G | G | G | P |
| | Moisture resistance (blistering) | G | G | G | G | G | P |

The present invention relates to the following C1 to C11.

[C1]

An aqueous coating composition that contains an aqueous dispersion of a modified polyolefin (A), an aqueous acrylic resin (B), and a blocked polyisocyanate compound (C) having at least one type of blocked isocyanate group selected from the group consisting of a blocked isocyanate group represented by the following general formula (I):

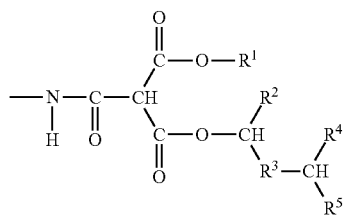

(I)

(wherein, $R^1$, $R^2$, $R^4$ and $R^5$ independently represent a hydrocarbon group having 1 to 12 carbon atoms, and $R^3$ represents a linear or branched alkylene group having 1 to 12 carbon atoms), a blocked isocyanate group represented by the following general formula (II):

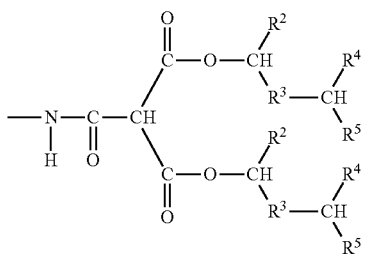

(II)

(wherein, $R^2$, $R^3$, $R^4$ and $R^5$ are the same as previously defined), and a blocked isocyanate group represented by the following general formula (III):

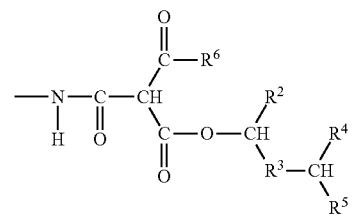

(III)

(wherein, $R^2$, $R^3$, $R^4$ and $R^5$ are the same as previously defined and $R^6$ represents a hydrocarbon group having 1 to 12 carbon atoms).

[C2]

The aqueous coating composition described in C1, wherein $R^1$ in general formula (I) represents an isopropyl group.

[C3]

The aqueous coating composition described in C1 or C2, wherein $R^6$ in general formula (III) represents an isopropyl group.

[C4]

The aqueous coating composition described in C1 or C2, wherein the blocked polyisocyanate compound (C) is obtained by reacting a blocked polyisocyanate compound (c3-1) having a blocked isocyanate group represented by the following general formula (IV):

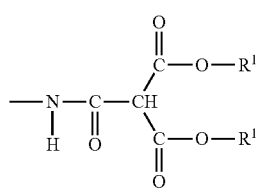

(IV)

(wherein, $R^1$ is the same as previously described and may be mutually the same or different), and a secondary alcohol (c4) represented by the following general formula (VI):

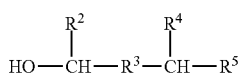

(VI)

(wherein, $R^2$, $R^3$, $R^4$ and $R^5$ are the same as previously defined).

[C5]

The aqueous coating composition described in C1 or C3, wherein the blocked polyisocyanate compound (C) is obtained by reacting a blocked polyisocyanate compound (c3-2) having a blocked isocyanate group represented by the following general formula (V):

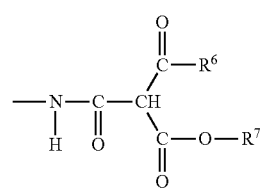

(V)

(wherein, $R^6$ is the same as previously defined and $R^7$ represents a hydrocarbon group having 1 to 12 carbon atoms), and a secondary alcohol (c4) represented by the following general formula (VI):

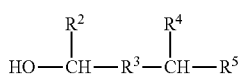

(VI)

(wherein, $R^2$, $R^3$, $R^4$ and $R^5$ are the same as previously defined).

[C6]

The aqueous coating composition described in any of C1 to C5, wherein the blocked polyisocyanate compound (C) is a blocked polyisocyanate compound (C') having a hydrophilic group.

[C7]

The aqueous coating composition described in any of C1 to C6, wherein the ratio of the solid content weights of the aqueous dispersion of a modified polyolefin (A)/aqueous acrylic resin (B) is within the range of 5/95 to 80/20.

[C8]

The aqueous coating composition described in any of C1 to C7, wherein the content ratio of the blocked polyisocyanate compound (C) is within the range of 10% by weight to 40% by weight based on the total solid content weight of the aqueous dispersion of a modified polyolefin (A), the aqueous acrylic resin (B) and the blocked polyisocyanate compound (C).

[C9]

A coating method in which the aqueous coating composition described in any of C1 to C8 is applied to the surface of a plastic base material following by applying a top-coating coating material on the coated surface thereof.

[C10]

The method described in C9, wherein a colored base coating material and clear coating material are sequentially applied as top-coating coating materials.

[C11]

An article coated according to the method described in C9 or C10.

The invention claimed is:

1. An aqueous coating composition, comprising: an aqueous dispersion of a modified polyolefin (A), an aqueous acrylic resin (B), and a blocked polyisocyanate compound (C) having at least one type of blocked isocyanate group selected from the group consisting of a blocked isocyanate group represented by the following general formula (I):

(I)

wherein, $R^1$, $R^2$, $R^4$ and $R^5$ independently represent a hydrocarbon group having 1 to 12 carbon atoms, and $R^3$ represents a linear or branched alkylene group having 1 to 12 carbon atoms, a blocked isocyanate group represented by the following general formula (II):

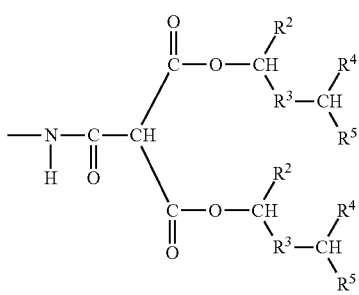

(II)

wherein, $R^2$, $R^3$, $R^4$ and $R^5$ are the same as previously defined, and a blocked isocyanate group represented by the following general formula (III):

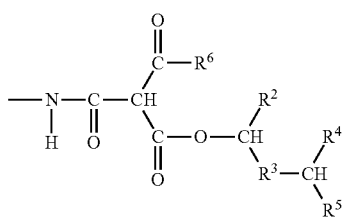

(III)

wherein, $R^2$, $R^3$, $R^4$ and $R^5$ are the same as previously defined and $R^6$ represents a hydrocarbon group having 1 to 12 carbon atoms and wherein the content ratio of the blocked polyisocyanate compound (C) is within the range of 10% by weight to 40% by weight based on the total solid content weight of the aqueous dispersion of a modified polyolefin (A), the aqueous acrylic resin (B) and the blocked polyisocyanate compound (C).

2. The aqueous coating composition according to claim 1, wherein $R^1$ in general formula (I) represents an isopropyl group.

3. The aqueous coating composition according to claim 1, wherein $R^6$ in general formula (III) represents an isopropyl group.

4. The aqueous coating composition according to claim 1, wherein the blocked polyisocyanate compound (C) is obtained by reacting a blocked polyisocyanate compound (c3-1) having a blocked isocyanate group represented by the following general formula (IV):

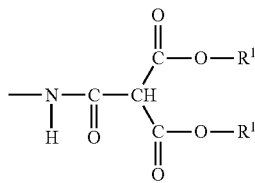

(IV)

wherein, each $R^1$ represents a hydrocarbon group having 1 to 12 carbon atoms, and may be mutually the same or different, and a secondary alcohol (c4) represented by the following general formula (VI):

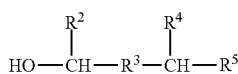

(VI)

wherein, $R^2$, $R^4$ and $R^5$ independently represent a hydrocarbon group having 1 to 12 carbon atoms, and $R^3$ represents a linear or branched alkylene group having 1 to 12 carbon atoms.

5. The aqueous coating composition according to claim 1, wherein the blocked polyisocyanate compound (C) is obtained by reacting a blocked polyisocyanate compound (c3-2) having a blocked isocyanate group represented by the following general formula (V):

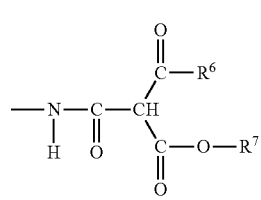

(V)

wherein, $R^6$ represents a hydrocarbon group having 1 to 12 carbon atoms and $R^7$ represents a hydrocarbon group having 1 to 12 carbon atoms, and a secondary alcohol (c4) represented by the following general formula (VI):

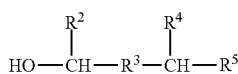

(VI)

wherein, $R^2$, $R^4$ and $R^5$ independently represent a hydrocarbon group having 1 to 12 carbon atoms, and $R^3$ represents a linear or branched alkylene group having 1 to 12 carbon atoms.

6. The aqueous coating composition according to claim 1, wherein the blocked polyisocyanate compound (C) is a blocked polyisocyanate compound (C') having a hydrophilic group.

7. The aqueous coating composition according to claim 1, wherein the ratio of the solid content weights of the aqueous dispersion of a modified polyolefin (A)/aqueous acrylic resin (B) is within the range of 5/95 to 80/20.

8. A coating method, comprising: applying the aqueous coating composition according to claim 1 to the surface of a plastic base material following by applying a top-coating material on the coated surface thereof.

9. The method according to claim 8, wherein the top-coating material comprises a colored base coating material and clear coating material which are sequentially applied.

10. An article coated according to the method according to claim 8.

\* \* \* \* \*